US009009126B2

(12) United States Patent
Spivack et al.

(10) Patent No.: US 9,009,126 B2
(45) Date of Patent: Apr. 14, 2015

(54) DISCOVERING AND RANKING TRENDING LINKS ABOUT TOPICS

(71) Applicant: Bottlenose, Inc., Sherman Oaks, CA (US)

(72) Inventors: Nova Spivack, Sherman Oaks, CA (US); Dominiek ter Heide, Amsterdam (NL)

(73) Assignee: Bottlenose, Inc., New York, NY (US)

(*) Notice: Subject to any disclaimer, the term of this patent is extended or adjusted under 35 U.S.C. 154(b) by 172 days.

(21) Appl. No.: 13/844,588

(22) Filed: Mar. 15, 2013

(65) Prior Publication Data
US 2014/0040281 A1 Feb. 6, 2014

Related U.S. Application Data

(60) Provisional application No. 61/678,057, filed on Jul. 31, 2012, provisional application No. 61/678,565, filed on Aug. 1, 2012, provisional application No. 61/723,280, filed on Nov. 6, 2012.

(51) Int. Cl.
G06F 17/30 (2006.01)
H04L 12/58 (2006.01)

(52) U.S. Cl.
CPC ............ G06F 17/3053 (2013.01); H04L 51/32 (2013.01)

(58) Field of Classification Search
USPC .................................................. 707/705, 748
See application file for complete search history.

(56) References Cited

U.S. PATENT DOCUMENTS

| 6,151,585 | A | 11/2000 | Altschuler et al. |
| 6,286,005 | B1 | 9/2001 | Cannon |
| 6,373,483 | B1 | 4/2002 | Becker et al. |
| 7,512,612 | B1 | 3/2009 | Akella et al. |
| 7,636,714 | B1 | 12/2009 | Lamping et al. |
| 7,885,844 | B1 | 2/2011 | Cohen et al. |
| 8,073,850 | B1 | 12/2011 | Hubbard et al. |
| 8,086,605 | B2 | 12/2011 | Xu et al. |
| 8,166,026 | B1 | 4/2012 | Sadler |
| 8,166,925 | B2 | 5/2012 | Suggett et al. |
| 8,352,549 | B2 | 1/2013 | Sacco et al. |
| 8,375,024 | B2 | 2/2013 | Goeldi |
| 2002/0023020 | A1 | 2/2002 | Kenyon et al. |
| 2002/0082923 | A1 | 6/2002 | Merriman et al. |

(Continued)

FOREIGN PATENT DOCUMENTS

| GB | 2502736 A | 12/2013 |
| GB | 2502737 A | 12/2013 |

(Continued)

OTHER PUBLICATIONS

International Search Report & Written Opinion for Application No. PCT/US2014/017757, Date of filing: Feb. 21, 2014, Applicant: Bottlenose, Inc., Date of Mailing: Jul. 7, 2014, 9 pages.

(Continued)

Primary Examiner — Kim Nguyen
(74) Attorney, Agent, or Firm — Perkins Coie LLP

(57) ABSTRACT

A system and a method for discovering and ranking trending links about topics are presented. The method comprises steps of receiving a plurality of messages from a social networking server, identifying a plurality of trending objects from the plurality of messages, generating at least one trending score for each trending object of the trending objects, and presenting a list of the trending objects based on the trending scores.

16 Claims, 25 Drawing Sheets

(56) References Cited

U.S. PATENT DOCUMENTS

| | | |
|---|---|---|
| 2003/0110056 A1 | 6/2003 | Berghofer et al. |
| 2003/0229531 A1 | 12/2003 | Heckerman et al. |
| 2004/0225592 A1 | 11/2004 | Churquina |
| 2005/0060312 A1 | 3/2005 | Curtiss et al. |
| 2005/0108630 A1 | 5/2005 | Wasson et al. |
| 2005/0114786 A1 | 5/2005 | Decombe |
| 2005/0131897 A1 | 6/2005 | Grasso et al. |
| 2005/0154690 A1 | 7/2005 | Nitta et al. |
| 2005/0192957 A1 | 9/2005 | Newbold |
| 2005/0256866 A1 | 11/2005 | Lu et al. |
| 2006/0041543 A1 | 2/2006 | Achlioptas |
| 2006/0059055 A1 | 3/2006 | Lin |
| 2006/0074836 A1 | 4/2006 | Gardner et al. |
| 2006/0112111 A1 | 5/2006 | Tseng et al. |
| 2006/0112146 A1 | 5/2006 | Song et al. |
| 2006/0173957 A1 | 8/2006 | Robinson et al. |
| 2006/0218577 A1 | 9/2006 | Goodman et al. |
| 2006/0248073 A1 | 11/2006 | Jones et al. |
| 2006/0282328 A1 | 12/2006 | Gerace et al. |
| 2006/0294085 A1 | 12/2006 | Rose et al. |
| 2006/0294086 A1 | 12/2006 | Rose et al. |
| 2006/0294134 A1 | 12/2006 | Berkhim et al. |
| 2007/0027744 A1 | 2/2007 | Carson et al. |
| 2007/0078699 A1 | 4/2007 | Scott et al. |
| 2007/0121843 A1 | 5/2007 | Atazky et al. |
| 2007/0124432 A1 | 5/2007 | Holtzman et al. |
| 2007/0150398 A1 | 6/2007 | Rossen et al. |
| 2007/0156636 A1 | 7/2007 | Norton et al. |
| 2007/0168533 A1 | 7/2007 | Canright et al. |
| 2007/0174057 A1 | 7/2007 | Genly |
| 2007/0208613 A1 | 9/2007 | Backer |
| 2007/0219863 A1 | 9/2007 | Park et al. |
| 2007/0226248 A1 | 9/2007 | Darr |
| 2007/0282867 A1 | 12/2007 | McAllister et al. |
| 2007/0297405 A1 | 12/2007 | He |
| 2008/0004942 A1 | 1/2008 | Calabria |
| 2008/0010253 A1 | 1/2008 | Sidhu et al. |
| 2008/0059466 A1 | 3/2008 | Luo et al. |
| 2008/0104225 A1 | 5/2008 | Zhang et al. |
| 2008/0133426 A1 | 6/2008 | Porat et al. |
| 2008/0133503 A1 | 6/2008 | Popescul et al. |
| 2008/0177813 A1 | 7/2008 | Wang et al. |
| 2008/0215429 A1 | 9/2008 | Ramer et al. |
| 2008/0215557 A1 | 9/2008 | Ramer et al. |
| 2008/0215571 A1 | 9/2008 | Huang et al. |
| 2008/0250450 A1 | 10/2008 | Larner et al. |
| 2008/0255935 A1 | 10/2008 | Madhavan et al. |
| 2008/0275833 A1 | 11/2008 | Zhou et al. |
| 2008/0275861 A1 | 11/2008 | Baluja et al. |
| 2008/0288305 A1 | 11/2008 | LaLuzerne et al. |
| 2008/0288596 A1 | 11/2008 | Smith et al. |
| 2008/0297513 A1 | 12/2008 | Greenhill et al. |
| 2008/0313011 A1 | 12/2008 | Rose et al. |
| 2009/0037521 A1 | 2/2009 | Zilca et al. |
| 2009/0049038 A1 | 2/2009 | Gross |
| 2009/0049308 A1 | 2/2009 | Jin et al. |
| 2009/0106224 A1 | 4/2009 | Roulland et al. |
| 2009/0106244 A1 | 4/2009 | Dash et al. |
| 2009/0119173 A1 | 5/2009 | Parsons et al. |
| 2009/0234828 A1 | 9/2009 | Tu |
| 2009/0319342 A1 | 12/2009 | Shilman et al. |
| 2009/0327275 A1 | 12/2009 | Walker et al. |
| 2010/0030648 A1 | 2/2010 | Manolescu et al. |
| 2010/0042944 A1 | 2/2010 | Robinson et al. |
| 2010/0049852 A1 | 2/2010 | Whitnah et al. |
| 2010/0058196 A1 | 3/2010 | Krishnan et al. |
| 2010/0070448 A1 | 3/2010 | Omoigui |
| 2010/0083124 A1 | 4/2010 | Druzgalski et al. |
| 2010/0100537 A1* | 4/2010 | Druzgalski et al. ............ 707/713 |
| 2010/0114946 A1 | 5/2010 | Kumar et al. |
| 2010/0119053 A1 | 5/2010 | Goeldi |
| 2010/0121707 A1 | 5/2010 | Goeldi |
| 2010/0121817 A1 | 5/2010 | Meyer et al. |
| 2010/0121839 A1 | 5/2010 | Meyer et al. |
| 2010/0174692 A1 | 7/2010 | Meyer et al. |
| 2010/0235489 A1 | 9/2010 | Cogan |
| 2010/0281041 A1 | 11/2010 | Almeida |
| 2010/0306049 A1 | 12/2010 | Kakade et al. |
| 2010/0306192 A1 | 12/2010 | Kapur et al. |
| 2010/0312769 A1 | 12/2010 | Bailey et al. |
| 2011/0004465 A1 | 1/2011 | Rose et al. |
| 2011/0022602 A1 | 1/2011 | Luo et al. |
| 2011/0029636 A1 | 2/2011 | Smyth et al. |
| 2011/0067030 A1 | 3/2011 | Isard et al. |
| 2011/0078156 A1 | 3/2011 | Koss |
| 2011/0093459 A1 | 4/2011 | Dong et al. |
| 2011/0096915 A1 | 4/2011 | Nemer |
| 2011/0184806 A1 | 7/2011 | Chen et al. |
| 2011/0191372 A1 | 8/2011 | Kaushansky et al. |
| 2011/0206198 A1 | 8/2011 | Freedman et al. |
| 2011/0212717 A1 | 9/2011 | Rhoads et al. |
| 2011/0213661 A1 | 9/2011 | Milana et al. |
| 2011/0238496 A1 | 9/2011 | Gurbuxani et al. |
| 2011/0238647 A1 | 9/2011 | Ingram et al. |
| 2011/0264599 A1 | 10/2011 | Dalton |
| 2011/0282874 A1* | 11/2011 | Xu et al. ............... 707/737 |
| 2011/0307429 A1 | 12/2011 | Probst et al. |
| 2011/0314007 A1* | 12/2011 | Dassa et al. ............... 707/723 |
| 2011/0320715 A1 | 12/2011 | Ickman et al. |
| 2012/0005224 A1 | 1/2012 | Ahrens et al. |
| 2012/0047219 A1* | 2/2012 | Feng et al. ............... 709/207 |
| 2012/0102021 A1* | 4/2012 | Hill et al. ............... 707/711 |
| 2012/0137367 A1* | 5/2012 | Dupont et al. ............... 726/25 |
| 2012/0158613 A1 | 6/2012 | Bollen et al. |
| 2012/0166438 A1* | 6/2012 | Wu et al. ............... 707/737 |
| 2012/0170726 A1* | 7/2012 | Schwartz ............... 379/93.02 |
| 2012/0185544 A1* | 7/2012 | Chang et al. ............... 709/206 |
| 2012/0191715 A1* | 7/2012 | Ruffner et al. ............... 707/738 |
| 2012/0246054 A1 | 9/2012 | Sastri |
| 2012/0272160 A1 | 10/2012 | Spivack et al. |
| 2012/0278164 A1 | 11/2012 | Spivack et al. |
| 2012/0296920 A1 | 11/2012 | Sahni et al. |
| 2013/0007126 A1 | 1/2013 | Ziemann |
| 2013/0013801 A1 | 1/2013 | Leeder |
| 2013/0018698 A1 | 1/2013 | Parnaby et al. |
| 2013/0046603 A1 | 2/2013 | Grigg et al. |
| 2013/0125027 A1 | 5/2013 | Abovitz |
| 2013/0144682 A1 | 6/2013 | Dhara et al. |
| 2013/0159507 A1 | 6/2013 | Mason et al. |
| 2013/0198204 A1 | 8/2013 | Williams et al. |
| 2013/0304818 A1 | 11/2013 | Brumleve et al. |
| 2014/0035920 A1 | 2/2014 | Duwenhorst |

FOREIGN PATENT DOCUMENTS

| | | |
|---|---|---|
| JP | 2003288437 A | 10/2003 |
| JP | 2006227965 A | 8/2006 |
| KR | 20090074108 A | 7/2009 |
| WO | WO-2006023977 A1 | 7/2006 |
| WO | WO-2006116516 A2 | 11/2006 |
| WO | WO-2008006059 A2 | 1/2008 |
| WO | WO-2009007754 A1 | 1/2009 |
| WO | WO-2009035618 A2 | 3/2009 |

OTHER PUBLICATIONS

Exam Report for GB1302155.5, Applicant: Bottlenose, Inc., Date of Mailing: Jun. 26, 2014, 2 pages.

Exam Report for EP12748879.9, Applicant: Bottlenose, Inc., Date of Mailing: Jul. 3, 2014, 8 pages.

Exam Report for GB13156765, Applicant: Bottlenose, Inc., Date of Mailing Jul. 4, 2014, 3 pages.

Exam Report for EP12749541.4, Applicant: Bottlenose, Inc., Date of Mailing Aug. 8, 2014, 8 pages.

Exam Report for GB1410563.9, Applicant: Bottlenose, Inc., Date of Mailing Jul. 30, 2014, 12 pages.

Internation Search Report and Written Opinion for Application No. PCT/US2013/52981, Date of Filing: Jul. 31, 2013, Applicant Bottlenose Inc., Date of Mailing: Oct. 8, 2013, 10 pages.

Ashkan et al., "Classifying and Characterizing Query Intent," University of Waterloo, Canada, Emory University, USA, Apr. 6, 2009, pp. 578-586.

(56) References Cited

OTHER PUBLICATIONS

Dai et al, "Mining Anchor Text Trends for Retrieval," Department of Computer Science and Engineering, Lehigh University, USA, Mar. 28, 2010, pp. 127-139.

Dietz et al., "Unsupervised Prediction of Citation Influences," Proceedings of the 24th International Conference on Machine Learning. Jun. 20, 2007, pp. 233-240.

Fan et al., "Suggesting Topic-Based Query Terms as Your Type," 2010 12th International Asia-Pacific Web Conference, Apr. 2010, 7 pages.

Garfield, "Citation Analysis as a Tool in Journal Evaluation," Essays of an Information Scientist, vol. 1, 1972, 24 pages.

Guha et al., "Propagation of trust and distrust," In Proceedings of the 13th International Conference on World Wide Web, New York, NY, USA, May 17-20, 2004, WWW '04. ACM. New York, NY, pp. 403-412.

Huang et al. "Conversational Tagging in Twitter," Proceedings of the 21st ACM Conference on Hypertext and Hypermedia, Jun. 13, 2010, 5 page.

Johnson, Celeb, "Likebutton.me Reveals What Your Friends 'Like' Across the Web," from the internet, http://www.switched.com, Apr. 26, 2010, 8 pages.

Liu et al., "Co-authorship networks in the digital library research community," 2005, Elsevier, Information Processing and Management 41, 2005, pp. 1462-1480.

Lu et al., "Finding Query Suggestions for PubMed," 2009, AMIA 2009 Symposium Proceedings, 5 pages.

Makkonen et al., "Topic Detection and Tracking with Spatio-Temporal Evidence," Department of Computer Science, University of Helsinki, Finland, published Spring 2003, 15 page.

Massa et al, "Using Trust in Recommender Systems: An Experimental Analysis," International Graduate School in Information and Communication Technologies, University of Trento, 38050 Povo, Italy, Feb. 26, 2004, 15 pages.

Page, et al., "The PageRank Citation Ranking: Bringing Order to the Web," from the internet, http://dbpubs.stanford.edu/pub, 1998.

Tao et al., "Selectivity Estimation of Predictive Spatio-Temporal Queries," Proceedings 19th International Conference on Data Engineering, ICDE'2003, Bangladore, India, Mar. 5-8, 2003, pp. 417-428.

von der Weth et al., "Towards an Objective Assessment of Centrality Measures in Reputation Systems," 2007 IEEE, 8 pages.

Zhou et al., "PowerTrust: A Robust and Scalable Reputation System for Trusted Peer-To-Peer Computing," 2007 IEEE, 30 pages.

Ziegler et al., "Propagation Models for Trust and Distrust in Social Networks," Information Systems Frontiers Dec. 7, 2005, pp. 337-358.

European Search Report for 14151134.5, Applicant: Bottlenose, Inc., Date of Mailing: May 27, 2014, 8 pages.

European Search Report for 14151154.3, Applicant: Bottlenose, Inc., Date of Mailing: May 27, 2014, 8 pages.

Brdiczka et al., "Automatic Detection of Interaction Groups," ICMI, 2005, 5 pages.

Wyatt et al, "Conversation and Speaker Segmentation in Privacy-Sensitive Situated Speech Data," Interspeech, 2007, 4 pages.

International Search Report and Written Opinion for Application No. PCT/US2013/68810, Date of Filing: Dec. 6, 2013, Applicant: Bottlenose Inc., Date of Mailing: May 7, 2014, 10 pages.

International Search Report & Written Opinion for Application No. PCT/US2012/026410, Date of filing: Feb. 23, 2012, Applicant: Spivack Nova et al., Date of Mailing: Sep. 23, 2012, 11 pages.

International Search Report & Written Opinion for Application No. PCT/US2012/026405, Date of filing: Feb. 23, 2012, Applicant: Spivack Nova et al., Date of Mailing: Dec. 28, 2012, 15 pages.

International Search Report & Written Opinion for Application No. PCT/US2013/023504, Date of filing: Jan. 28, 2013, Applicant: Bottlenose Inc., Date of Mailing: Jun. 11, 2013, 20 pages.

International Search Report & Written Opinion for Application No. PCT/US 2013/26763, Date of filing: Feb. 19, 2013, Applicant: Bottlenose, Inc., Date of Mailing: Apr. 23, 2013, 8 pages.

International Search Report & Written Opinion for Application No. PCT/US2013/26528, Date of filing: Feb. 15, 2013, Applicant: Bottlenose Inc., Date of Mailing: Apr. 18, 2013, 9 pages.

Exam Report for CA2,866,615 Applicant: Bottlenose, Inc., Date of Mailing Oct. 29, 2014, 4 pages.

Exam Report for GB1315674.0, Applicant: Bottlenose, Inc., Date of Mailing Nov. 13, 2014, 7 pages.

* cited by examiner

*FIG. 1A*

TRENDING PEOPLE

 **Starbucks Coffee
(@Starbucks)**

Freshly brewed tweets from Brad, Lee, and Paige at Starbucks.

2727k followers   78k following

---

 **UberFacts
(@UberFacts)**

The most unimportant things you'll never need to know.

2544k followers   1 following

---

 **1DupdatesCAN
(@1DupdatesCAN)**

Fée & Roxie ;  French Canadians.  Welcome to our updates page.
CLICK THE LINK : http://www.twitlonger.com/show/i06gva   Niall follows and Dmed us.

45k followers   282 following

---

 **Nick Gamble
(@NickJGamble)**

Everything has its beauty, but not everyone can see it.

726 followers   238 following

---

 **The Housewife
(@DiamondDiploma)**

diamonddiploma@live.com

36k followers   10398 following

*FIG. 1D*

RECENT COMMENTS 

Hm, I think I'm going to make my next computer primarily linux and just have windows 7 for gaming occasionally.

 @KylaranAe...

A minute ago 

Did u knw that No OS stays on ma PC 4more 'an 3 months, thanx 2 Linux Distros, Mac Os n' Windows

 @Jesba_Ve...

A minute ago 

Stallman is calling Steam for Linux unethical. That's great and all, but they aren't making him use it. The less MS the better!

 @KrisDouglas 2 minutes ago 

It's spelled Linux, but it's pronounced 'Not Windows'
It's spelled Windows, but it's pronounced 'Aieeeeeeee!'
(Shannon Hendrix)

 @Amaanya...

3 minutes ago 

<lilo> Fairlight: udp is the light margarine of tcp/ip transport protocols :) – Seen on #Linux #ff

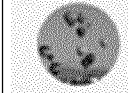 @Fairwinds...

5 minutes ago 

C++ Software Engineers required – London - £45,000 – C++, GUI, Linux – Contact davekelly@trentpearce.co.uk

 @Trent_Pea...

7 minutes ago 

See more Comments »

*FIG. 1F*

TOP LINUX TRENDS NOW

Valve Linux video games attacked

A leading PC-user rights campaigner has voiced concern about video games developer Valve's move to sell Linux-based versions of its products. Richard Stallman – founder of the Free Software Foundation and the GNU operating system – said charging users for DRM-protected games on the open-source platform would be "unethical."

bbc

Ask Slashdot: the Best Linux Setup To Transition Windows Users? - Slashdot

First time accepted submitter Quantus347 writes "I am trying to convince a number of people to give Linux a chance, arguing that it has come a long way on the road of consumer usability. Can you, oh Wise Ones of Slashdot, recommend a Linux setup that will be as similar as possible to a Windows envi...

slashdot

Steam's Newell: Windows 8 "catastrophe" driving Valve to embrace Linux

Valve head-and one-time Microsoft employee-Gab Newell has branded Windows 8 "a catastrophe for everyone in the PC space" at videogame conference Casual Connect in Seattle. The Valve boss continued, saying that in the fallout from Windows 8, "we'll lose some of the top-tier PC/OEMs, who will exit the market.

arstechnica

5 Best New Features of the Linux 3.5 Kernel Release | Linux.com

Following some initial concern earlier in the month about a large volume of small, last-minute pull requests that ultimately necessitated a seventh release candidate, Linux creator Linus Torvalds on Saturday published the final version 3.5 of the Linux kernel. "Ok, not a lot happened since -rc7," Torvalds admitted in his announcement email.

linux

*FIG. 1G*

TRENDING TOPICS

Twitter   Olympics   Facebook   Olympic

NBC   Google▼   Apple   #Olympics▼

Yahoo▼   India   #nbcfail   London   iPhone

Japan▼   MICROSOFT▼   America london2012   Saga   Hulu▲   China   Android▲ iOS   Romney   BBC   NYC   U.S   #India▲

Instagram   VentureBeat   #TwitterFail

HootSuite▲   Milton Friedman▲   API   Obama

Delhi   ECB   Evernote   #iWonder   #bbc2012

Playbook▲

See more Trends »

Top Mentioned People (by Mentions)

| | # Mentions |
|---|---|
| @youtube | 3,503 |
| @peopleschoice | 2,827 |
| @celebnewsfast | 1,526 |
| @carlosparejo | 1,036 |
| @_kosher | 800 |
| @imghettobarbie | 786 |
| @foursquare | 779 |
| @eonline | 655 |
| @real_liam_payne | 560 |
| @arianagrande | 523 |
| @soundclick | 497 |
| @cassadeepope | 493 |
| @sophiaabrahao | 481 |

Top Contributors (by Mentions)

| | # Mentions |
|---|---|
| @RealHollywoodTr | 3,172 |
| @JulienLanger | 1,570 |
| @celebnews1456 | 1,559 |
| @dreezyfasho | 1,520 |
| @StevenSeagal | 1,393 |
| @Celeb_News_UK | 974 |
| @i_Celeb_Gossip | 910 |
| @DonyaPatel | 907 |
| @i_AnneHathaway | 890 |
| @i_KellyClarkson | 810 |
| @Pornific | 793 |
| @high_on_glitter778 | |
| @carmenPorn | 777 |

Top Mentioned People (by Impressions)

| | # Impressions |
|---|---|
| @celebrityhg | 109,080k |
| @youtube | 54,857k |
| @goldenglobes | 33,833k |
| @marlonlwayans | 29,233k |
| @cw_network | 25,716k |
| @juddapatow | 25,567k |
| @soundclick | 25,320k |
| @nytimes | 23,550k |
| @timestalks | 23,151k |
| @lesliejmann | 21,763k |
| @covenanthouse | 20,767k |
| @virginmlive | 20,740k |
| @timeculture | 16,566k |

Top Contributors (by Followers)

| | # Followers |
|---|---|
| @PerezHilton | 402,721k |
| @eonline | 345,330k |
| @RealTonyRocha | 327,103k |
| @HuffingtonPost | 148,860k |
| @disneywords | 110,153k |
| @CELEBRITYHG | 109,080k |
| @high_on_glitter | 103,896k |
| @OMGFacts | 62,354k |
| @funkmasterflex | 51,576k |
| @TheFunnySayings | 48,617k |
| @106andpark | 47,329k |
| @EW | 42,128k |
| @YouTube | 41,560k |

Top Positive Contributors

| | #Mentions | #Followers |
|---|---|---|
| @RealHollywoodTr | 3,127 | 17,409k |
| @dreezyfasho | 1,520 | 3,182k |
| @StevenSeagal | 1,393 | 3,506k |
| @ObnoxiousBot | 679 | 1,189k |
| @KateUptonWatch | 573 | 1,143k |
| @pomz1 | 571 | 4,248k |
| @i_Jen_Lawrence | 539 | 673k |
| @JBStarFanatic | 525 | 2,849k |
| @patbelieber | 509 | 2,122k |
| @Marvin_Promotes | 471 | 569k |
| @FlixsterUVHelp | 438 | 843k |
| @HapyBabyWorkout | 405 | 768k |
| @Cneil_IahWeh | 300 | 4,611k |

Top Negative Contributors

| | #Mentions | #Followers |
|---|---|---|
| @Celeb_News_UK | 974 | 4,392k |
| @i_Celeb_Gossip | 910 | 1,950k |
| @i_AnneHathaway | 890 | 2,126k |
| @J_Aniston_Watch | 662 | 1,013k |
| @Fan_HilaryDuff | 612 | 1,193k |
| @MileyCyrus_Look | 607 | 2,153k |
| @MeganFox_Watch | 577 | 2,300k |
| @KayneWest_Fans1 | 563 | 594k |
| @LadyGaGa_News | 505 | 2,396k |
| @ChrisHemsworthv | 470 | 737k |
| @NickiMinajWatch | 362 | 875k |
| @Chin_Hartney | 340 | 686k |
| @Oprah_Watch | 328 | 718k |

*FIG. 9*

Nike Trend Activity

78 — 434K people (60%) started paying attention to Lance Armstrong in one hour

31 — 200 people shared "Lance Armstrong Resigns...." in last 12 hours

23 — Sentiment around Lance Armstrong dropped 60% this week

64 — Sentiment of women around Nike+ falls 10% today

Pages: Previous 1 2 3 4 ... 20 21 Next

Bottlenose Runtime Information                              ✕

Plugins   Simulations

Plugins currently running: (* = builtIn plugins)
  [unload] Bit.ly URL Shortening*
  [unload] Standard Hotkeys*
  [unload] Settings*
  [unload] Plugin Directory*
  [unload] Add Streams*
  [unload] Multi Column Stream View*
  [unload] Overview Stream View*
  [unload] Sonar Stream View*
  [unload] Reader Stream View*
  [unload] Newspaper Stream View*
  [unload] Profile Stream View*
  [unload] Indicate Number*
  [unload] Desktop Notification*
  [unload] Play Sound*
  [unload] Set Color*
  [unload] Dashboard Context View*
  [unload] Search Context View*
  [unload] User Subscription*
  [unload] Stream Data Explorer
  [unload] Bottlenose Dev Tools*
  [unload] Dingbats

*FIG. 14*

DISCOVERING AND RANKING TRENDING LINKS ABOUT TOPICS

CROSS-REFERENCE TO RELATED APPLICATIONS

This application claims the priority and the benefit of U.S. Provisional Application No. 61/678,057 under 35 U.S.C. 119 (e), entitled "DISCOVERING AND RANKING TRENDING LINKS ABOUT TOPICS," filed on Jul. 31, 2012, the contents of which are incorporated herein by reference.

This application also claims the benefit of U.S. Provisional Application No. 61/678,565 under 35 U.S.C. 119(e), entitled "DISCOVERING AND RANKING TRENDING LINKS ABOUT TOPICS," filed on Aug. 1, 2012, the contents of which are incorporated herein by reference.

This application also claims the benefit of U.S. Provisional Application No. 61/723,280 under 35 U.S.C. 119(e), entitled "SYSTEMS AND METHOD FOR CONTINUOUS AND REAL-TIME OR NEAR REAL-TIME TARGETING OF SOCIAL NETWORK ADVERTISEMENTS AND OTHER PROMOTIONAL CONTENT," filed on Nov. 6, 2012, the contents of which are incorporated herein by reference This application is related to U.S. patent application Ser. No. 13/403,937, entitled SYSTEM AND METHOD FOR ANALYZING MESSAGES IN A NETWORK OR ACROSS NETWORKS,' filed on Feb. 23, 2012, the contents of which are incorporated herein by reference.

This application is related to U.S. patent application Ser. No. 13/752,333, entitled TRENDING OF AGGREGATED PERSONALIZED INFORMATION STREAMS AND MULTI-DIMENSIONAL GRAPHICAL DEPICTION THEREOF,' filed on Jan. 28, 2013, the contents of which are incorporated herein by reference.

This application is related to U.S. patent application Ser. No. 13/752,343, entitled "TARGETED ADVERTISING BASED ON TRENDING OF AGGREGATED PERSONALIZED INFORMATION STREAMS," also filed on Jan. 28, 2013, the contents of which are incorporated herein by reference.

This application is related to U.S. patent application Ser. No. 13/403,948, entitled "ADAPTIVE SYSTEM ARCHITECTURE FOR IDENTIFYING POPULAR TOPICS FROM MESSAGES," filed on Feb. 23, 2012, the contents of which are incorporated herein by reference.

This application is related to U.S. patent application Ser. No. 13/771,069, entitled NATURAL LANGUAGE PROCESSING OPTIMIZED FOR MICRO CONTENT,' filed on Feb. 19, 2013, the contents of which are incorporated herein by reference.

This application is related to U.S. patent application Ser. No. 13/403,962, entitled "SYSTEMS AND METHODS FOR RECOMMENDING ADVERTISEMENT PLACEMENT BASED ON IN NETWORK AND CROSS NETWORK ONLINE ACTIVITY ANALYSIS," also filed on Feb. 23, 2012, the contents of which are incorporated herein by reference.

BACKGROUND

Through web-based or application media services like Twitter and Facebook, a user is exposed to a vast amount of messages from hundreds if not thousands of online sources and friends, culminating in massive amounts of information overload. Individuals and organizations are increasingly unable to filter signal from noise efficiently, or at all, in the growing number of information streams they must interact with on a daily basis. What is needed is a new set of technologies that help to make sense of information and trends in real-time streams of information. Key to this endeavor are new technologies that can measure activity within streams in real-time in order to detect the early signs of emerging trends, and to track them as they subsequently evolve.

BRIEF DESCRIPTION OF THE DRAWINGS

One or more embodiments of the present disclosure are illustrated by way of example and are not limited by the figures of the accompanying drawings, in which like references indicate similar elements.

Figure 1A:
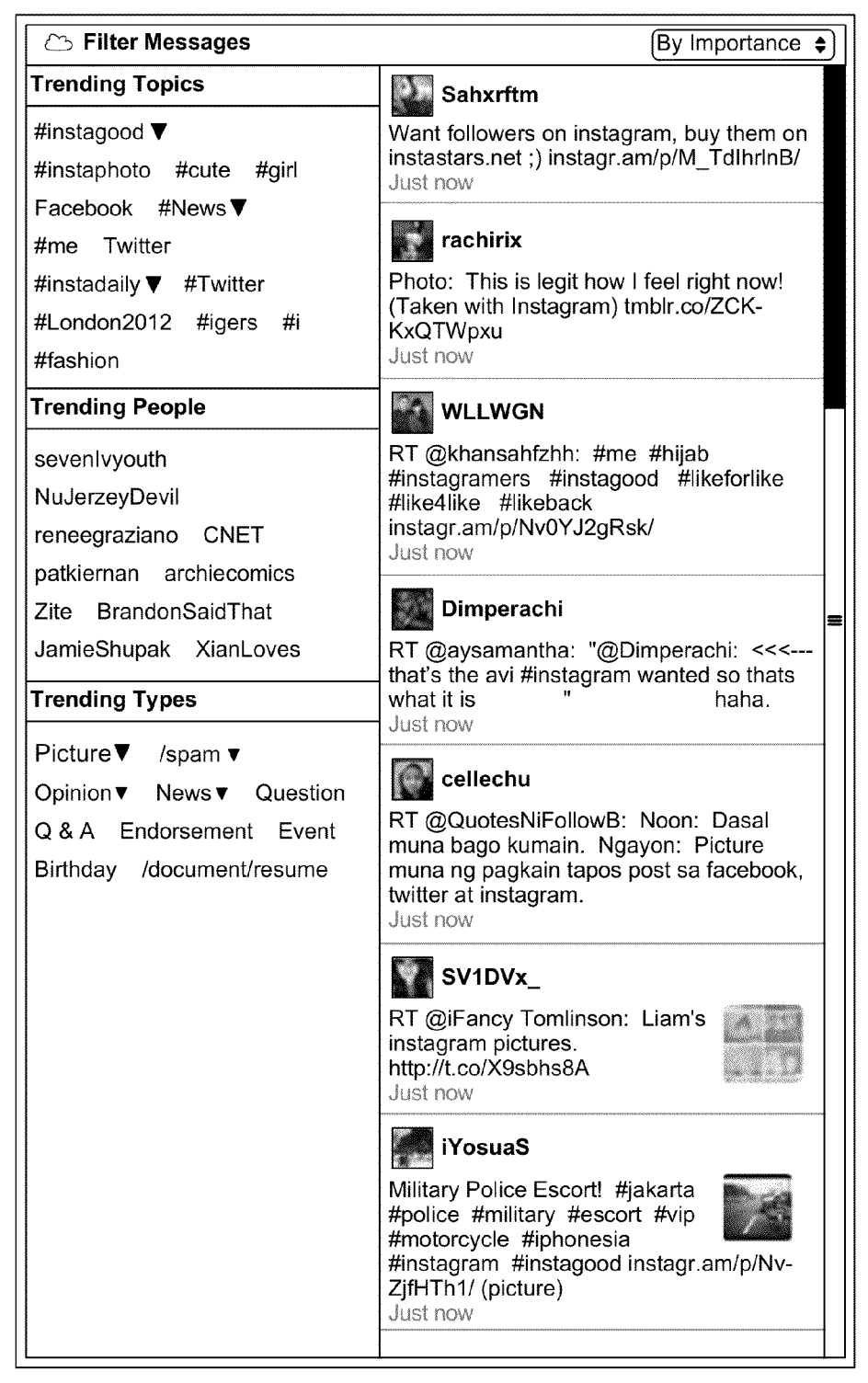

FIGS. 1A-1H depict example screenshots showing the trends generated from various streams by the StreamSense System.

FIG. 2B illustrates a screenshot showing an example stream data explorer interface.

FIG. 9 illustrates a screenshot of example lists of trending topics.

FIG. 14 illustrates a screenshot of an example dashboard interface for dynamically loading, unloading or hot-swapping micro apps.

DETAILED DESCRIPTION

Figure 1B:
Figure 1C:
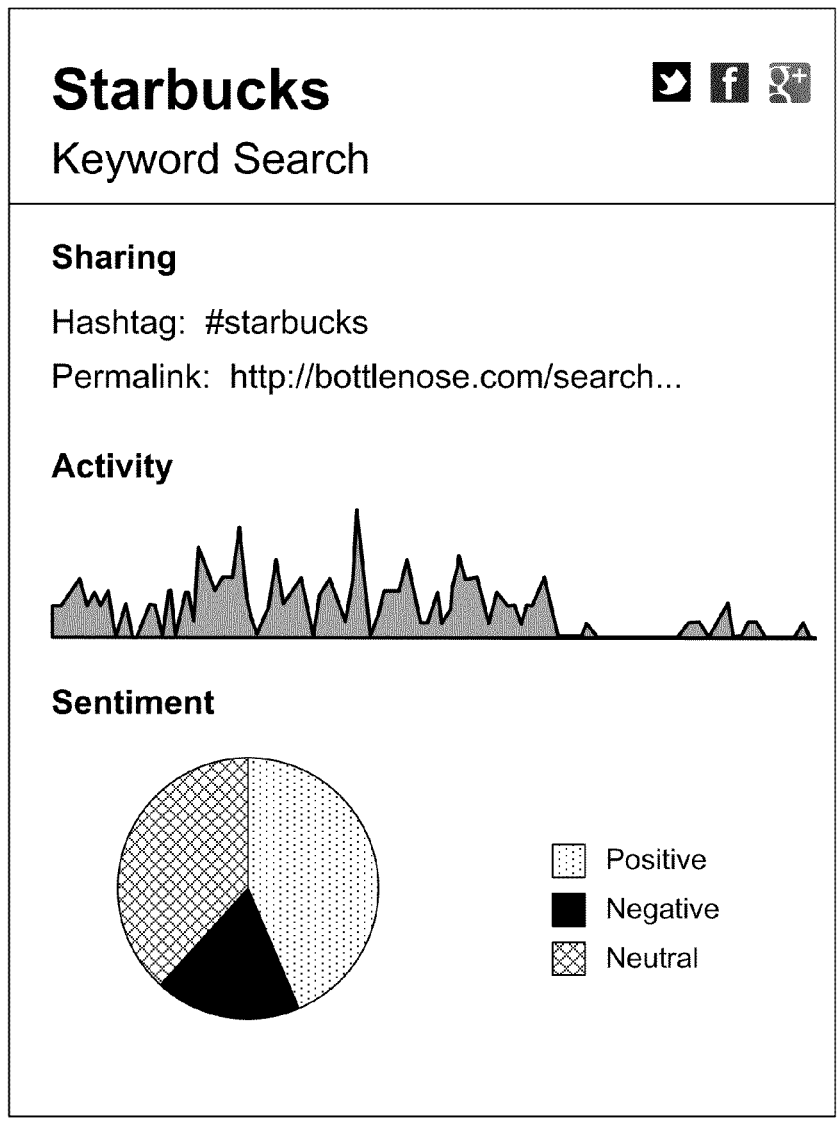
Figure 1E:

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for discovering and ranking trading links about topics and concepts.

A natural language process stack (also referred to as StreamSense, natural language processor, and natural language processing system) is presented. The StreamSense System allows machines to understand the information within the streams. The stream can be any collection of messages, or chain of data packets. For instance, the stream can be a stream of messages from social networks. The StreamSense System generates a set of metadata from the stream to give a machine an understanding of the content the stream. The functionality of the StreamSense System is to detect the trends in the stream.

StreamSense Calculation

After the metadata of the message stream are generated, the messages and the associated metadata are processed by a StreamSense calculation process. Each piece of the metadata is assigned with one or more scores. For example, the topic "Japan" could have occurred 34 times, so the mass score for that metadata item would be 34. In another example, the latest occurrence time for the topic was 10 minutes ago and the topic has a momentum of 6472 because it was mentioned relatively recently. A similar process can be conducted on any piece of metadata that has been extracted from the message stream.

For example, momentum can be calculated using a power law, and can boost the positions of the most recent messages exponentially in a ranking list of the messages by adjusting a boost factor. How much to boost and over which period depend on the number and throughput of messages in a stream. In one embodiment, a maximum boost multiplier is predetermined as 100 and a boost period is predetermined as 1 day. That means messages that are 1 minute old are boosted by one-hundred, and messages from 24 hours ago are boosted by one. After 24 hours, the boost will drop below 1 and starts to approach 0, thereby decreasing the message's momentum score.

The StreamSense System can calculate the momentum score (also referred to as velocity) in the following way:

ageMinutes=the age of the message in minutes (e.g. 5);

maxBoost=100 (by default);

oneDay=one day in minutes=24*60=1440;

boostPeriod=Log(maxBoost)/Log(oneDay);

Velocity=maxBoost/ageMinutes^boostPeriod.

For ranking links, the StreamSense System can calculate the importance score for each of the corresponding messages and take the highest score. Or the StreamSense System can combine the importance scores. The importance score includes can depend on the velocity, and further depend on the following scores in its calculation (each of the scores is normalized):

Mass=the number of reposts (number of different users posting the link);

Relevance=the relevance to the query, (the score is multiplied with 0.001 when not relevant, i.e. does not include or match the query words in the title or description);

Attention=attention score for the topic or person, depending on the user's interest profile;

Influence=the number of followers of the author of the message;

Link score=Velocity*Mass*Relevance*Attention*Influence.

StreamSense Querying

The metadata generated by the StreamSense System can be utilized in many different ways. For instance, the trends can be discovered by ordering the metadata by momentum. Popularity can be determined by ordering the metadata by mass.

The scores calculated for ranking purposes can be normalized. For instance, the scores can be normalized to a 10 points or 100 points scale.

There are different types of trends that can be discovered from the streams using StreamSense, for instance, popular links, trending topics, popular links of a type, recent messages of a type, trending types, popular people on a topic, trending links about a topic, recent links about a stock symbol, and popular links around a sentiment.

Combinations of metadata and scores can be used to retrieve insights about a stream. Trends can be used to get insights on a context of the stream. For example, the StreamSense System can discover "trending topics" in the context of a stream of messages authored by a person. The message is about the latest interests of that person. In another example, the StreamSense System can be used for messages written by friends of a person. The result can include a filtered view of the important or interesting things happening inside the social network of that person.

Trends of the messages can reveal more information regarding the trending topics. In one example, trending links in the context of all messages authored on all social networks in the last day that contain the word "Japan" will give a comprehensive view on what's going on right now in Japan. In another example, trending people with negative sentiment in the context of a brand will give insights about which people are unhappy and becoming vocal about it.

In addition to a flat list of trends ordered by a certain score, the StreamSense System can conduct a co-occurrence analysis on the metadata. This co-occurrence analysis (i.e. a clustered retrieval method) scans one or more types of metadata and identifies the co-occurrence of the metadata in the messages. For example, if the topic "Japan" and the hash tag "#tokyo" are often mentioned in the same message, these two metadata (i.e. the topic "Japan" and the hash tag "#tokyo") have a high co-occurrence. Thus, associated pieces of metadata (i.e. metadata having high co-occurrence) can be used together to discover and rank trends within the message.

FIGS. 1A-1H depict example screenshots showing the trends generated from various streams by the StreamSense System.

Architecture Overview

Figure 2A:
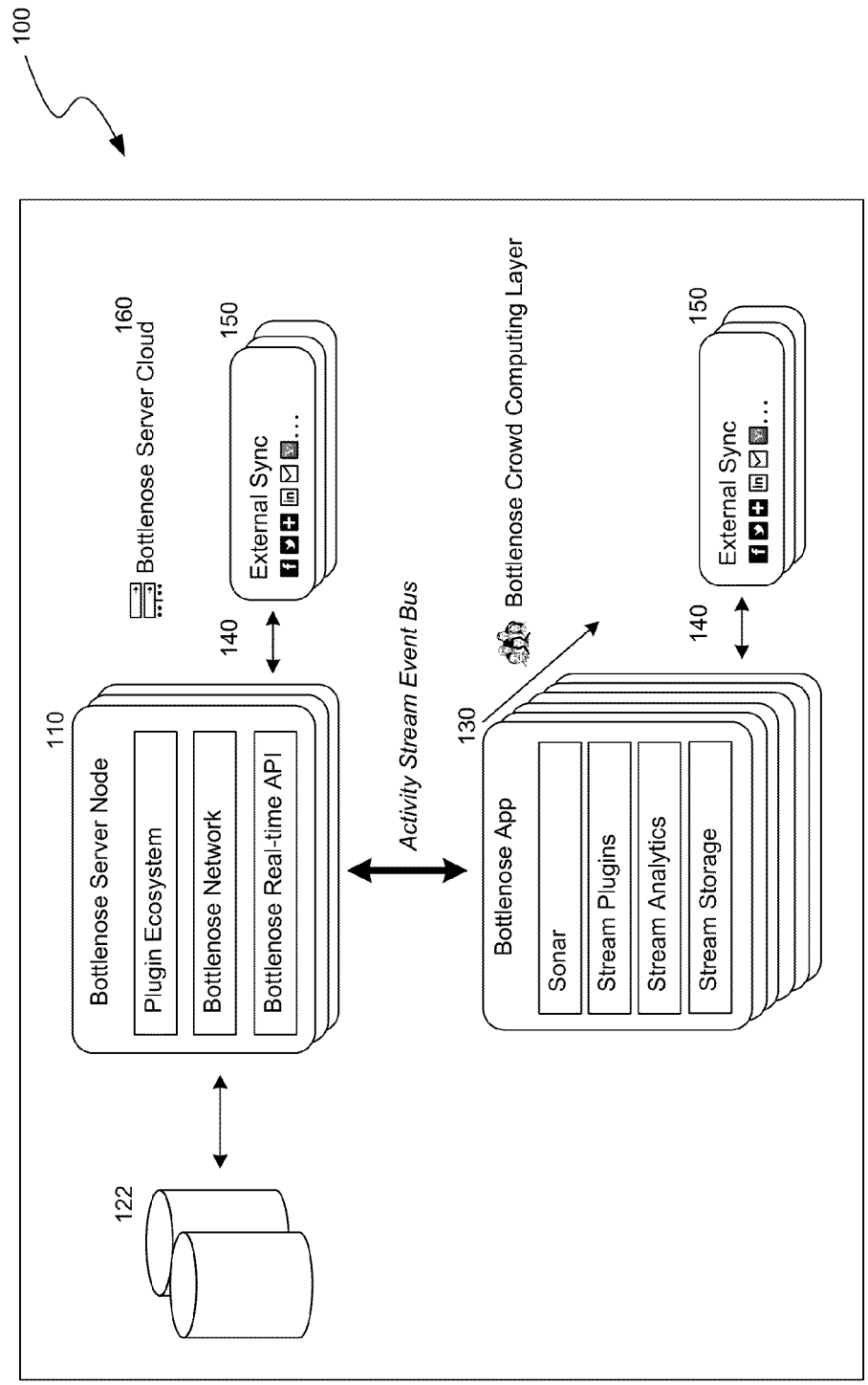
FIG. 2A illustrates an example architecture diagram of a social intelligence system for mediating and orchestrating communications with the client nodes and external services.

FIG. 2A illustrates an example architecture diagram of a social intelligence system 100 for mediating and orchestrating communications with the client nodes and external services. The social intelligence system 100 includes a plurality connected server nodes 110. The server nodes 110 of the social intelligence system 100 store a social network information store 122 (including social graph and message store). Messages posted by users of the intelligence cluster 100 are stored in the server nodes 110. The metadata of the messages travels between users and clients via the social intelligence system 100.

The social intelligence system 100 can also have client applications 132 running on client nodes 130. Messages from third-party networks 150 come in through sync connectors 140 which run on the server nodes 110 as well as client nodes 130. Many services allow direct messaging pipelines from the client nodes 130 to the external services from the third-party networks 150.

Storage on the server nodes does not take place until an action is done on these messages (e.g. like, annotate, repost). This avoids storing vast amounts of messages for each user which can become very costly when thousands of messages come in per user per day.

The client applications 132 can run multiple layers of stream analytics. In one embodiment, all layers of stream analytics run in the client nodes 130 to reduce the amount of CPU burdens on the server nodes 110. In another embodiment, the social intelligence system can be made more decentralized by enabling client-to-client messaging between client nodes. In yet another embodiment, the client nodes 130 can be configured to run as a stand-alone agent in a cloud computer platform 160.

Data Layer

All data coming in from external services are normalized based on a standard. In one embodiment, the data are normalized based on Activity Streams Open Standard ("ASOS"). The normalization process makes sure that all messages are stored in a structured way and that there is a common vocabulary to communicate regarding to the social objects. For example, a "User Timeline on Twitter" is normalized to "A Person's Activities".

External services can be queried by using a query language. In one embodiment, the external services are queried by using Activity Stream Query Language (ASQL). Using ASQL, data can be pushed and pulled between services. To support a new external service, the social intelligence system can implement a common Activity Stream interface for that service using ASQL.

Figure 2B:
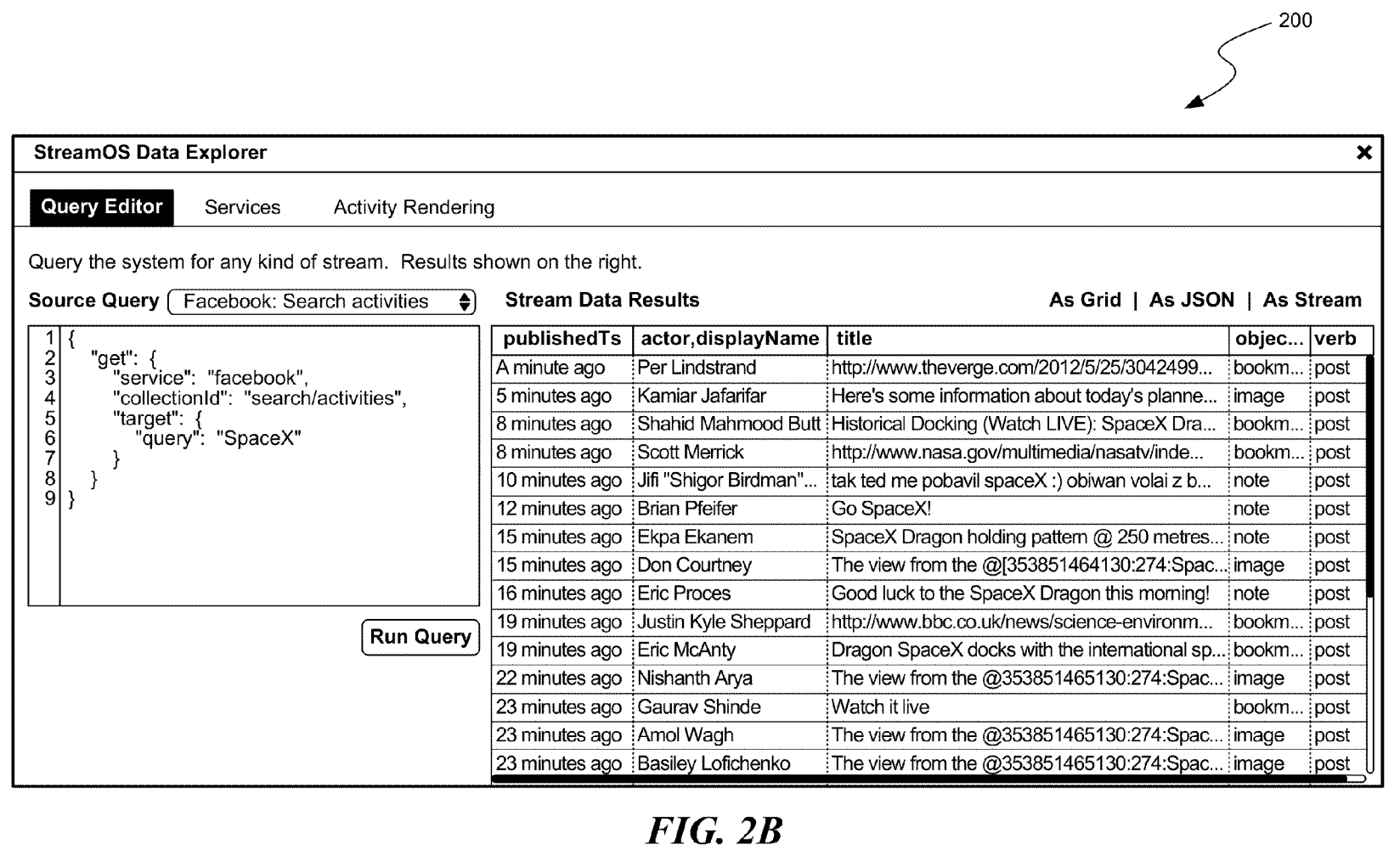

FIG. 2B illustrates a screenshot showing an example stream data explorer interface 200. The social intelligence provides the stream data explorer interface 200 via the client nodes 130 or the server nodes 110 to developers to push or pull any data streams between services.

After normalization of the message data, all messages are enriched with metadata (details of the metadata will be discussed in the following section). The social intelligence system then filters these messages by matching the metadata of the messages against specific rules. In one embodiment, the social intelligence system can use a specialized rule language for this which allows complex conditional statements in filters.

Figure 3:
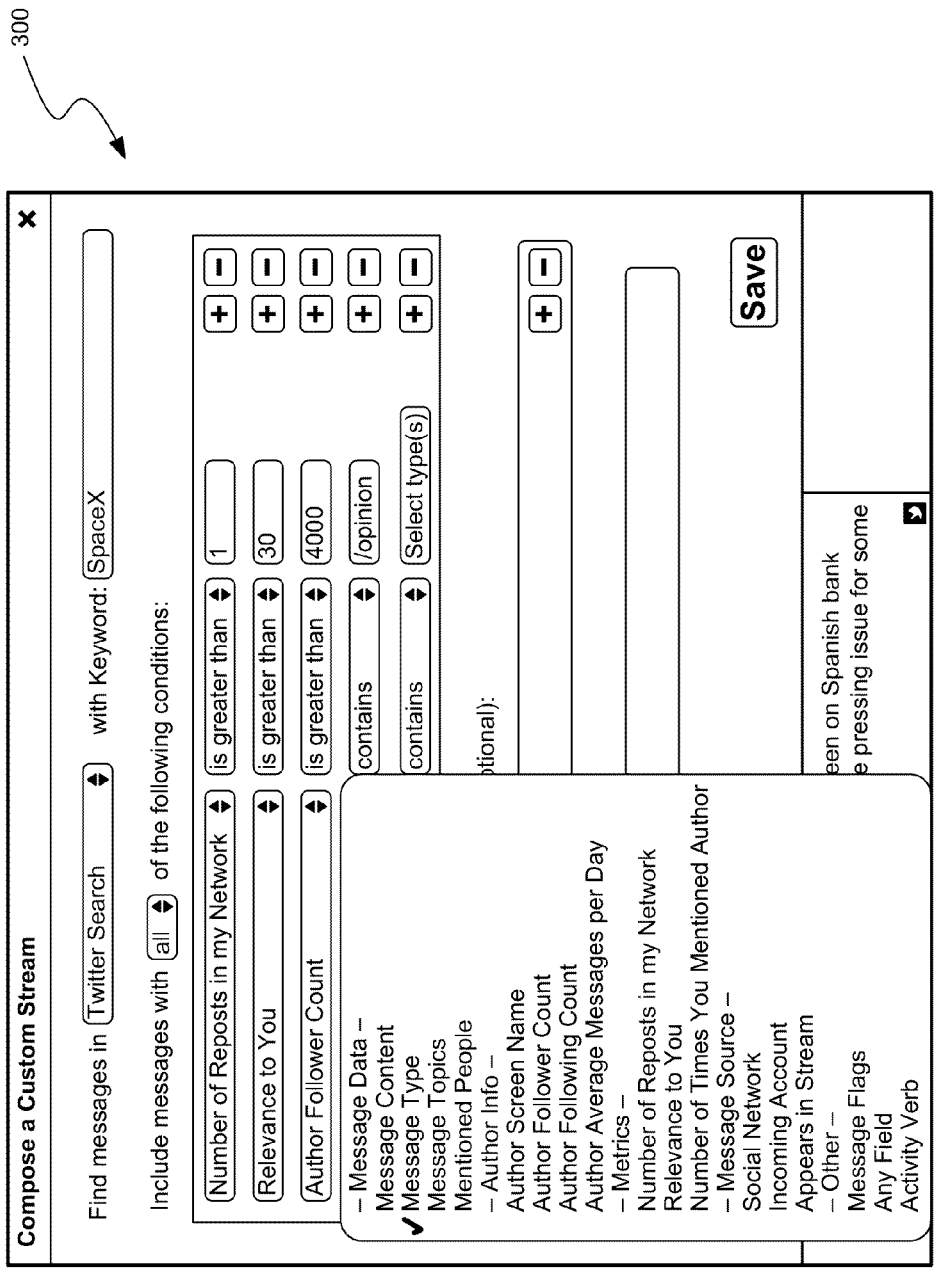
FIG. 3 illustrates a screenshot showing an example user interface for filtering messages.

FIG. 3 illustrates a screenshot showing an example user interface 300 for filtering messages. The social intelligence provides user interface 300 to users or developers to specify rules for filtering messages. The actual rule language can be chosen by the users, which allows more advanced conditionals to be specified.

Natural Language Processing ("NLP") and Annotation Capabilities

The social intelligence system utilizes a natural language processing stack optimized for microcontents. A microcontent is a small group of words that can be skimmed by a person to get a clear idea of the content of a content container such as a web page. Examples of microcontent include article headlines, page titles, subject lines, e-mail headings, instant messages, blog posts, RSS feeds, and abstracts. Such microcontent may be taken out of context and displayed on a directory, search result page, bookmark list, etc. Microcontents (e.g. Twitter messages, Facebook messages, and short message service (SMS) messages) are often written in a casual way. Such microcontents contain micro-syntax like repost directives and hashtags.

Parsing messages for the real-time web requires dealing with vast numbers of microcontents (e.g. small messages). That requires an efficient handling of the microcontents. In one embodiment, the natural language processing stack can be implemented in JavaScript. The natural language processing stack can run in any modern JavaScript environment (e.g. Webkit, NodeJS, Internet Explorer, etc.).

In one embodiment, the natural language processing stack extracts different types of metadata from the messages including topics, types, categories, languages, and others. The topics metadata include keywords that are most relevant to the messages. In some embodiments, the natural language processing stack assigns confidence scores to each of these keywords. The types metadata includes status of the messages, mood of the messages, whether the message is an offer, whether the message is a service, whether the message is a news. The categories metadata can include business, technology, entertainment, etc. The languages metadata indicates the language that the message's content is written in. Other metadata include uniform resource locators ("URLs"), mentions, hashtags, repost content, emoticons, content identification keys, etc.

The natural language process stack (also referred to as StreamSense, natural language processor, and natural language processing system). The StreamSense System allows machines to understand the information within the streams. A stream herein refers to any stream of information. The stream can be any collection of messages, or chain of data packets. For instance, the stream can be a stream of messages from social networks. The StreamSense System has multiple applications, including interest profiling, targeted advertising to real-time search indexing. The context of the stream is an important factor in the outcome and use of the StreamSense System. For example, when using the StreamSense System on streams in the context of a person, (e.g. messages authored by a person), the result of the StreamSense System processing will help a better understanding of that person.

The StreamSense System generates a set of metadata from the stream to give a machine an understanding of the content the stream. The functionality of the StreamSense System is to detect the trends in the stream.

Figure 4:
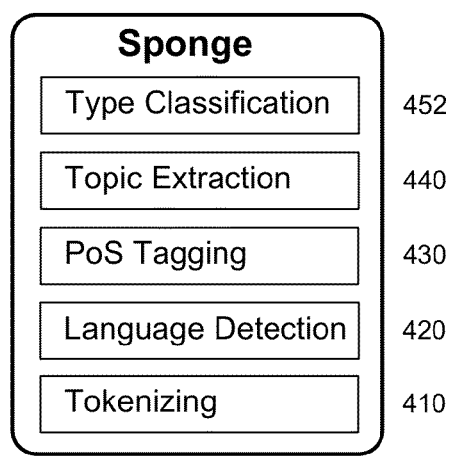
FIG. 4 illustrates an example architecture of a natural language processing stack including multiple layers.

FIG. 4 illustrates an example architecture of a natural language processing stack 400 including multiple layers. The natural language processing stack 400 processes a message by running the message through the layers. The first layer is a tokenizer layer 410 that can handle micro-syntax and punctuation (E.g. RT, /via, /cc, etc.). The tokenizer breaks a stream of text up to words phrases, symbols, or other meaningful elements called tokens. The list of tokens becomes input for further processing such as parsing or text mining. The second layer is a language detector layer 420. The language detector 420 can include a dictionary-based language detector that will detect if a message is in English or other languages. The language detector 420 can also include an NGram detector that can identify any language.

Then the messages go through a part of speech ("PoS") tagger layer 430. A part-of-speech tagging, also called grammatical tagging or word-category disambiguation, is the process of marking up a word in a text as corresponding to a particular part of speech, based on both its definition, as well as its context—i.e. relationship with adjacent and related words in a phrase, sentence, or paragraph. For instance, a form of PoS tagging is the identification of words as nouns, verbs, adjectives, adverbs, etc. In one embodiment, the PoS tagger layer 430 can use error-driven transformation-based tagger such as Brill tagger that is streamlined towards picking out nouns and proper nouns.

The fourth layer is a topic extractor layer 440. The topic extractor is unique in that it can do entity recognition without needing existing databases. For instance, topics like the name of Lady Gaga's latest album can be identified without having a prior dictionary of known entities. The topic extractor 440 extract topics from the messages and assigns confidence scores to the extracted topics based on capitalization and other factors. This approach is different than conventional entity extraction in which the extraction relies on dictionary lookups. For example, the latest album by Lady Gaga that was just released would not show up in such a dictionary and therefore will not be extracted by the conventional entity extraction approach as a topic. The topic extractor 440 can get such valuable information that cannot be identified by a dictionary.

Figure 5:
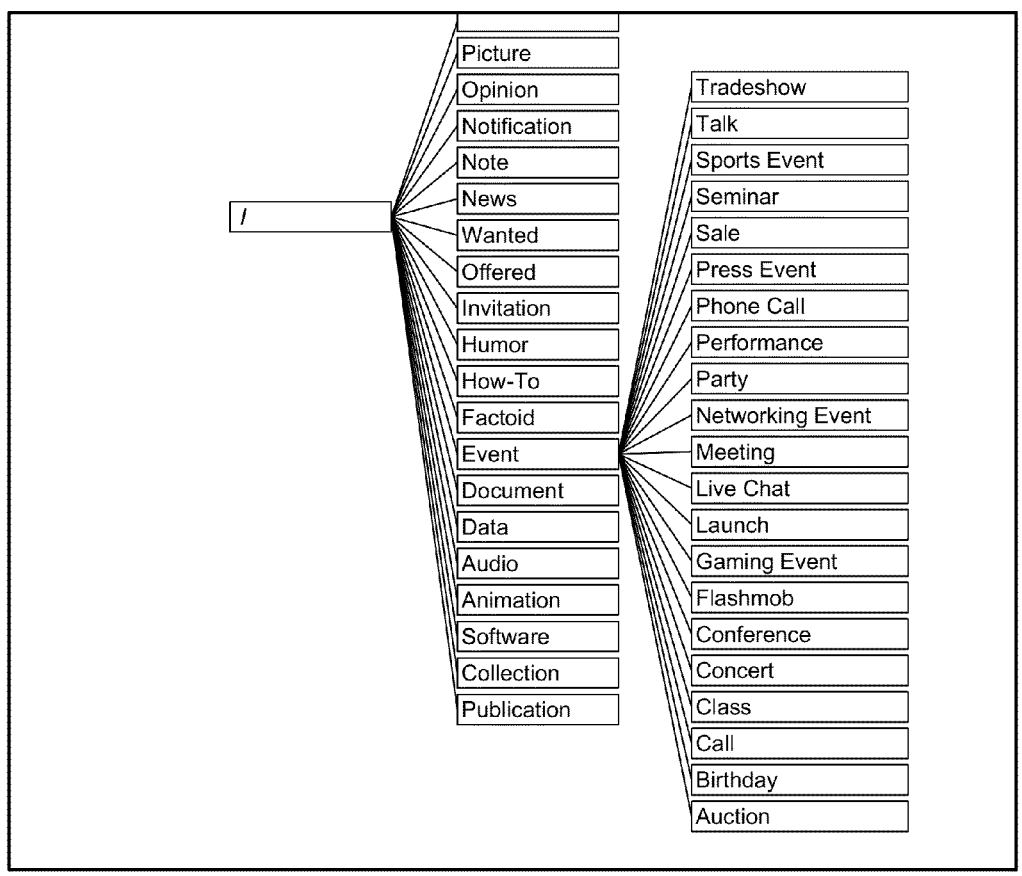
FIG. 5 illustrates an example of a database of classes and relationships between the classes.

The fifth layer is a type classification layer 450. In order to classify types and identify categories of messages, the natural language processing stack utilizes a database (also referred to as ontology) of classes together with a database of annotation rules. These annotation rules are composed of lists of names and patterns that help to assign the proper type tree to a message. For instance, more than a hundred message classes can be defined in the database with rules to detect these automatically. FIG. 5 illustrates an example of a database of classes and relationships between the classes. The social intelligence system can include an internal administration tool to edit the information related to class database and the annotation rules. In one embodiment, the layers can be applied to microcontents as steps of a method for microcontent natural language processing. Once a microcontent is received from a social networking site, the method can first tokenize the microcontent into a plurality of token texts. The language of the microcontent is detected and a dictionary is selected based on the detected language. The method further applies a part-of-speech tagging process on the microcontent based on the dictionary. The results are detected related pronouns and nouns form the microcontent. One or more topics are extracted from the detected related pronouns and nouns. The method can further include steps of ranking streams containing the microcontents.

Figure 6:
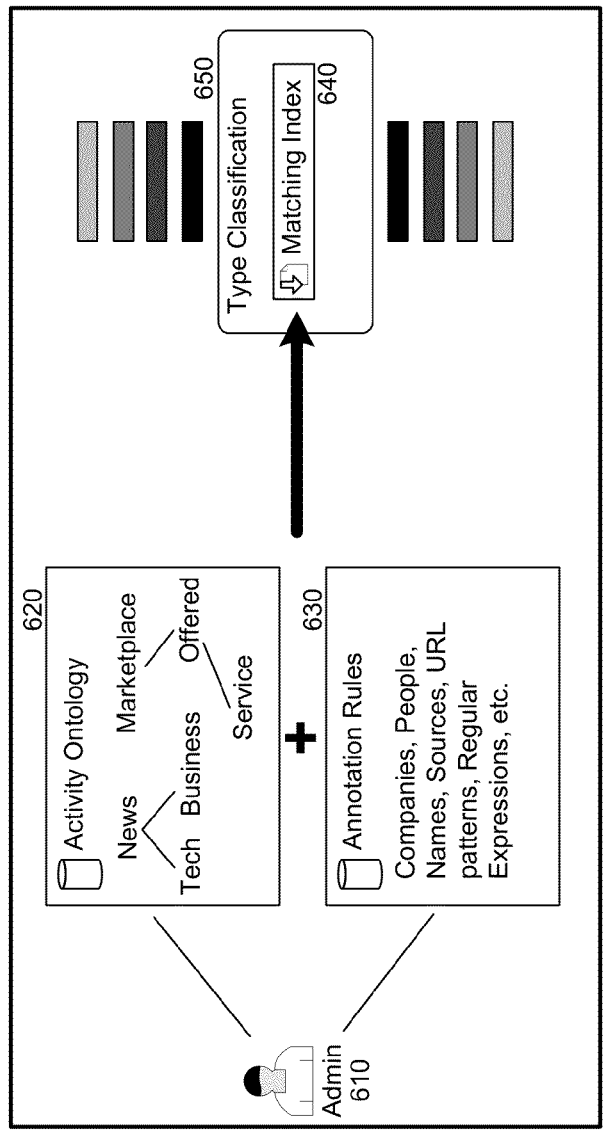
FIG. 6 illustrates an example process for a type classification process.

FIG. 6 illustrates an example process for a type classification process. The administrator 610 specifies the content of the database 620 (i.e. ontology) of the classes and the database 630 of annotation rules. The information in the database 620 of classes and the database 630 of annotation rules is compiled into a matching index 640 of the type classification layer 650. The matching index 640 is a set of expressions that ensures a highly efficient matching. The matching index 640 can be sent to web browsers or anywhere the type classification layer 650 is running.

In addition to the type classification process, the natural language processing stack can further perform sentiment analysis to classify the sentiment of each message. Sentiment can be positive, negative or neutral. The sentiment analysis can run fully on the client nodes (as well as server nodes) allowing for high scalability. In one embodiment, to make this possible and light weight, the natural language processing stack includes a sentiment classifier implemented as a Naive Bayesian classifier, which is trained offline on an annotated set of positive, negative and neutral messages. Then the resulting probabilistic model is send to the client node for the sentiment classification.

Figure 7:
FIG. 7 illustrates a screenshot of an example message annotation tool interface.

FIG. 7 illustrates a screenshot 700 of an example message annotation tool interface. The interface provides types and topics for a specific message identified by a type classification layer of a natural language processing stack. Using the interface, the user is able to delete any types or topics that the user thinks incompatible with the message. The interface further provides a sentiment (positive, neutral or negative) determined by the sentiment classifier. Using the interface, the user is able to manually change the sentiment annotation for the message.

Stream Rank

After messages are enriched with the metadata, the messages and their metadata are put through a stream rank analyzer. The stream rank analyzer takes the messages for a given context and produce new intelligence in the form of metadata for a stream of the context. For example, when the topic Japan gets mentioned very often, this is obviously something significant. The stream rank analyzer takes the messages for the topic Japan and produce new intelligence in the form of metadata for a stream regarding Japan.

Figure 8:
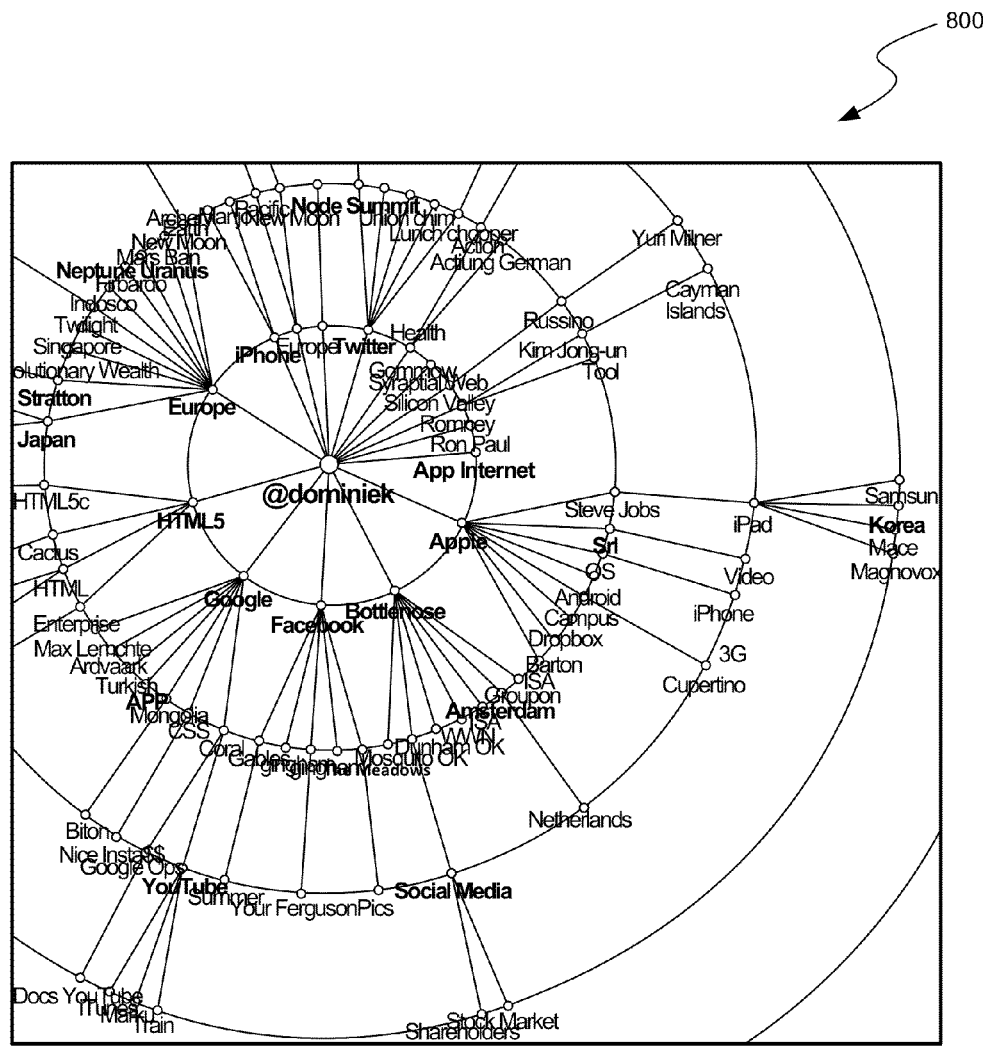
FIG. 8 illustrates a screenshot of an example visualization interface for results of a clustering process of a stream rank analyzer

The stream rank analyzer can include two components. One is a clustering component for analyzing co-occurrences of metadata in a stream, and producing a graph data structure that can be used to recognize clusters of related data. Another is a profiling component for producing a flat list of most occurring and most trending (highest velocity or momentum) metadata. FIG. 8 illustrates a screenshot of an example visualization interface 800 for results of a clustering process of a stream rank analyzer.

The stream rank analyzer can look at any attribute of a message and rank the message. Examples of the attributes are: topics, types, mentioned people, authors, hashtags, links, media, keywords, author information, source information, etc. Each of these metadata attribute is counted and weighted in the clustering and profiling components. This results in a new data set of the most trending and relevant metadata items for a stream. In both clustering and profiling components, the time factor is used to look at which metadata items are gaining trend (i.e. velocity).

The results of stream rank analyzer can be used to provide all sorts of new intelligence for streams, including but not limited to: profiling interests, search personalization, targeted advertising, alerts of trending global events, etc.

Cloud and Trend Database

In one embodiment, the stream rank analyzer can run in a cloud computing platform in which the metadata of each message is converted into trend a trend database record. These trend database records have fields that store counts for specific conditions in which the message occurred in a given timeframe. For example, the message "I hate Christmas", can result in the following metadata: Topic=Christmas, Sentiment=Negative. Hence, for the trend database record with topic name "Christmas" the stream rank analyzer increases the 'sentiment negative counter' with 1. As time progresses and more messages flow through the stream rank analyzer, the trend database reflects a state of all the trends that are happening in a stream. Queries regarding the topics can be performed on this trend database. For instance, a list of topics that had the most negative can be generated by count of negative sentiment. FIG. 9 illustrates a screenshot of example lists of trending topics. For instance, the lists includes a list of top mentioned people by count of mentions, a list of top contributors by count of mentions, a list of top mentioned people by impressions, a list of top contributors by followers, a list of top positive contributors and a list of top negative contributors.

Trend database records are created for any piece of metadata regarding a message, including topics, types, hashtags, mentioned people, author, links, geographic segments, ethnicity, gender, etc.

For instance, the stream rank analyzer can use the following attributes as counters for the trend database record:
Volume (i.e. total number of messages that were found, which always increases)
Impressions (cumulative follower count of all authors)
Cumulative Klout Score
Gender Male, Gender Female
Ethnicity Black, Ethnicity White, Ethnicity Asian, etc.
Geo Segment Asia, Geo Segment Europe, Geo Segment Africa, etc.
Sentiment Negative, Sentiment Positive, Sentiment Neutral, Sentiment-20, Sentiment-19, Sentiment-18, Sentiment-17, etc. (e.g. A full heat map of different grades of sentiment).
Type Humor, Type Commercial, Type News, Type Mood, Type Question, Type Opinion, Type Event, Type Visual, etc. (For each type classification, the stream rank analyzer counts the number of messages that occurred. In this way, it is possible to find for example the 'Most Commercial Topics').
Network Twitter, Network Facebook, Network Z, etc.

For each of these counters except for volume, the rank stream analyzer can also use relative counters. These relative counters are percentages of the volume. So for instance, if the "Gender Male" count is 2, and the total volume is 4, the "Gender Male Percentage" counter would be "50%".

Also, the rank stream analyzer can use acceleration counters associated with the relative counters. This is basically a counter that compares the database of the current timeframe with the timeframe before. For instance, if there were 1000 impressions in the timeframe before, and 3000 impressions in the current timeframe, the "impressions acceleration counter" would be "+2000".

Thirdly, the rank stream analyzer can store specific ratio counters for some of the fields. These ratio counters allow the easy retrieval of specific ratio trends. For instance, a "Gender Female Ratio" helps the retrieval of "Most Masculine Topics", "Most Feminine Geo Regions", "Most Feminine Links", etc. Some example ratio counters are Gender (Male VS Female), Ethnicity (Black VS White, Black VS Asian, etc.), Engagement (Volume VS Impressions), and Network (Twitter VS Facebook, etc.).

Audience Segments

In one embodiment, the stream rank analyzer can be used to detect trends in any stream of messages. One of such streams includes messages from an audience segment; i.e. messages by a group of people that match a certain criteria. For example, "Female Soccer Fans" or "Republican Beer Drinkers". By using the stream rank analyzer can find trends from these segments and new insights to answer specific marketing research and business intelligence questions.

For any given topic (e.g. a brand called "Heineken"), the stream rank analyzer can compare the ranks of streams between different audience segments. In that way, the stream rank analyzer can show how the topic is trending and performing across different segments. This includes the ability to drill down into specific attributes of the trends, for example, how is the brand performing across different ethnicities in each segment, or how is sentiment across segments, or how opinionated is the brand in different segments.

Another example of an audience segment is "Everyone". When the stream rank analyzer is sued for the stream of all global mentions and messages, the stream rank analyzer can show what topics people around the world are focusing.

Quadrant Visualization of Stream Rank Trends

Figure 10:
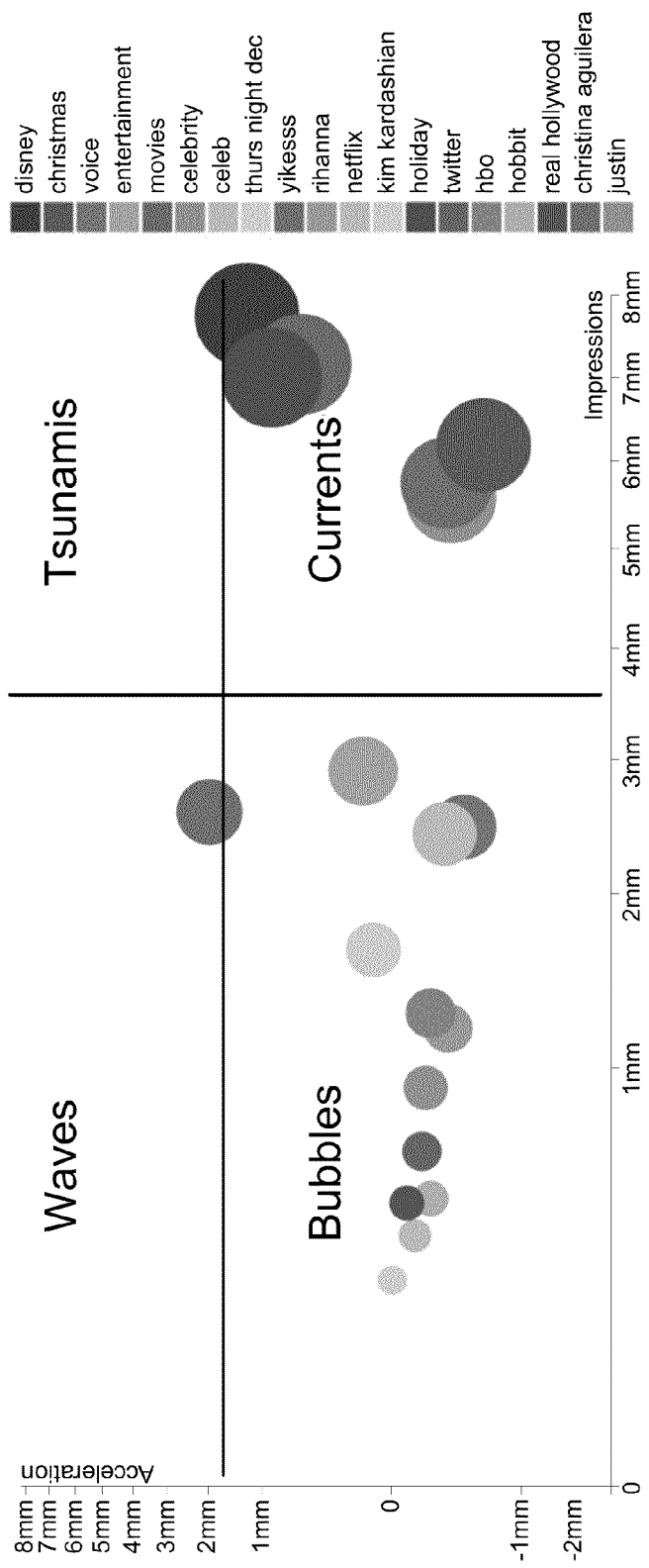
FIG. 10 illustrates an example quadrant plot for stream rank trends.

The stream rank analyzer can further include a quadrant visualizer for plotting the current "Trend State" on a scatter plot which is divided into 4 quadrants, based on the recorded stream rank trends. FIG. 10 illustrates an example quadrant plot for stream rank trends. The X axis can represent any of the trend attributes, e.g. volume, impressions, male count, etc. In the example shown in FIG. 10, the X axis represents "Impressions." The Y axis can represent the acceleration of the trend attribute (i.e. How much did it gain compared to the previous timeframe). The result is a scatter plot as showed in FIG. 10. The volumes of the scatters represent the size of the trend (i.e. Z axis). In some embodiments, the Z axis can represent other attributes as mentioned in previous paragraphs.

Each quadrant of the scatter plot has a different meaning. The Waves quadrant indicates small trends that are spiking right now, but have a low momentum. The Bubbles quadrant indicates no trend yet (low acceleration, and low momentum). The Currents quadrant indicates sustained trends that have a low acceleration. The Tsunamis quadrant indicates trends that have high momentum, high acceleration.

Figure 11:
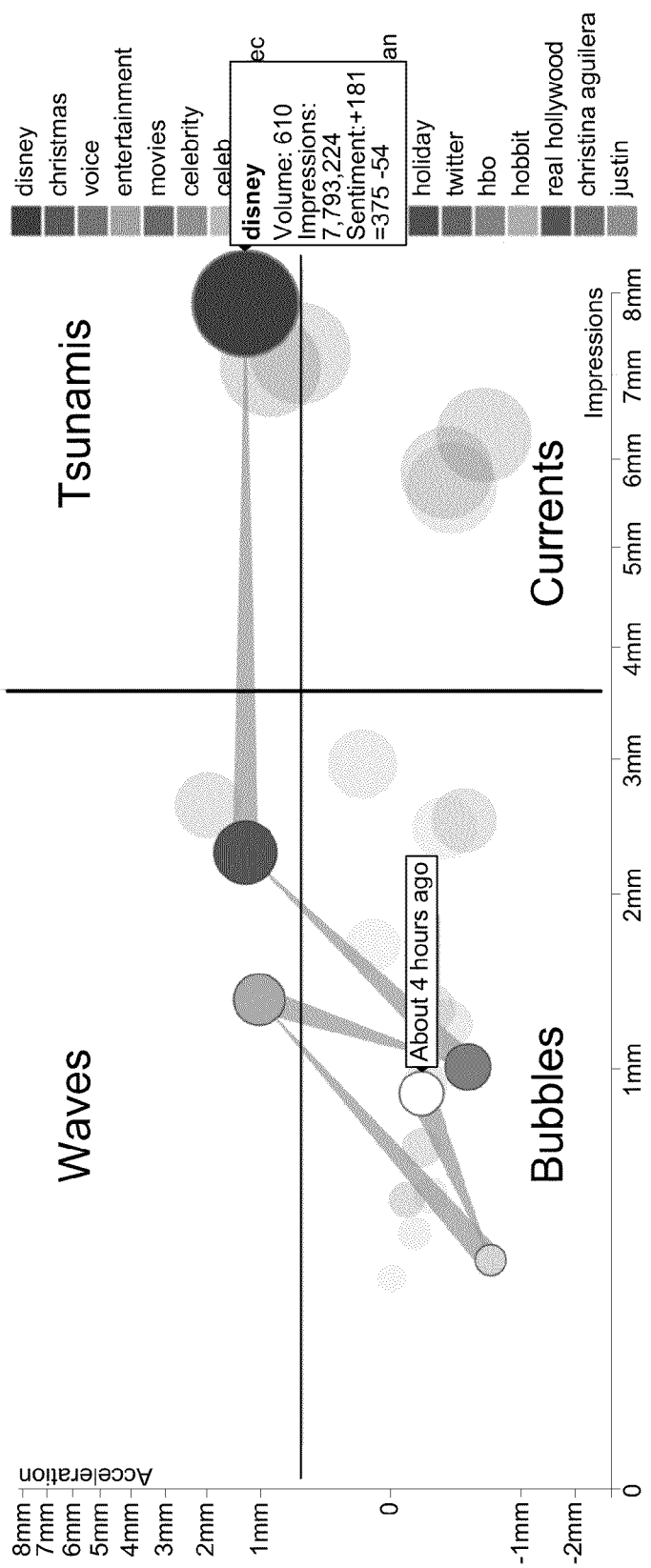
FIG. 11 illustrates example changes of the quadrant plot over a time period.

For each timeframe a plot of this kind can be visualized. These plots can be animated over time to reflect how the trend is changing across different quadrants over a time period, as illustrated in FIG. 11. The movement of these scatters (i.e. trends) allows users to see how attention is changing in the stream. For example, when a trend starts moving to the right-side of the "Waves" quadrant, this could be an indicator of a Tsunami-sized trend about to happen.

Stream Rank Derived Trend Activity Events

The stream rank analyzer can further generate a trend activity record for each attribute that changed inside a stream rank trend. For example, if the volume of topic X dropped 25% in a given timeframe, the stream rank analyzer can generate a trend activity of a severity of "topic X, volume −25%". Any attribute mentioned in the previous sections can be used to generate a trend activity record. For each of these trend activity events, the stream rank analyzer can assign an impact score based on the severity in event. For instance, an event of volume change of 40% has a higher impact score than an event of volume change of 4%.

Figure 12:
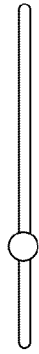
FIG. 12 illustrates an example of a UI that shows different trend activity events.

FIG. 12 illustrates an example of a UI that shows different trend activity events. The UI shows trend activity events regarding a topic "Nike." Each trend activity event is associated with an impact score. For instance, the event of "434K people (60%) started paying attention to Lance Armstrong in one hour" has an impact score of 78. The information about the trend activity events can be used to show both a high-level and a low-level detail of how attention moves around regarding any given topic.

Decentralized Attention Indexing

In order to analyze messages on a global level, the stream rank analyzer includes a strategy for building an index of real-time social networking data. Conventional scraping and spidering approaches employed by search engines such as Google rely on software programs that find, crawl and download web pages using a large server infrastructure. This approach does not work for the real-time data needs of social networks. By the time the crawl would be finished, all data can be outdated.

The stream rank analyzer provides a solution by including application programs for indexing messages part of the browser. The stream rank analyzer includes a browser extension or other form of software called an attention tracker that can be installed within the browser.

Figure 13:
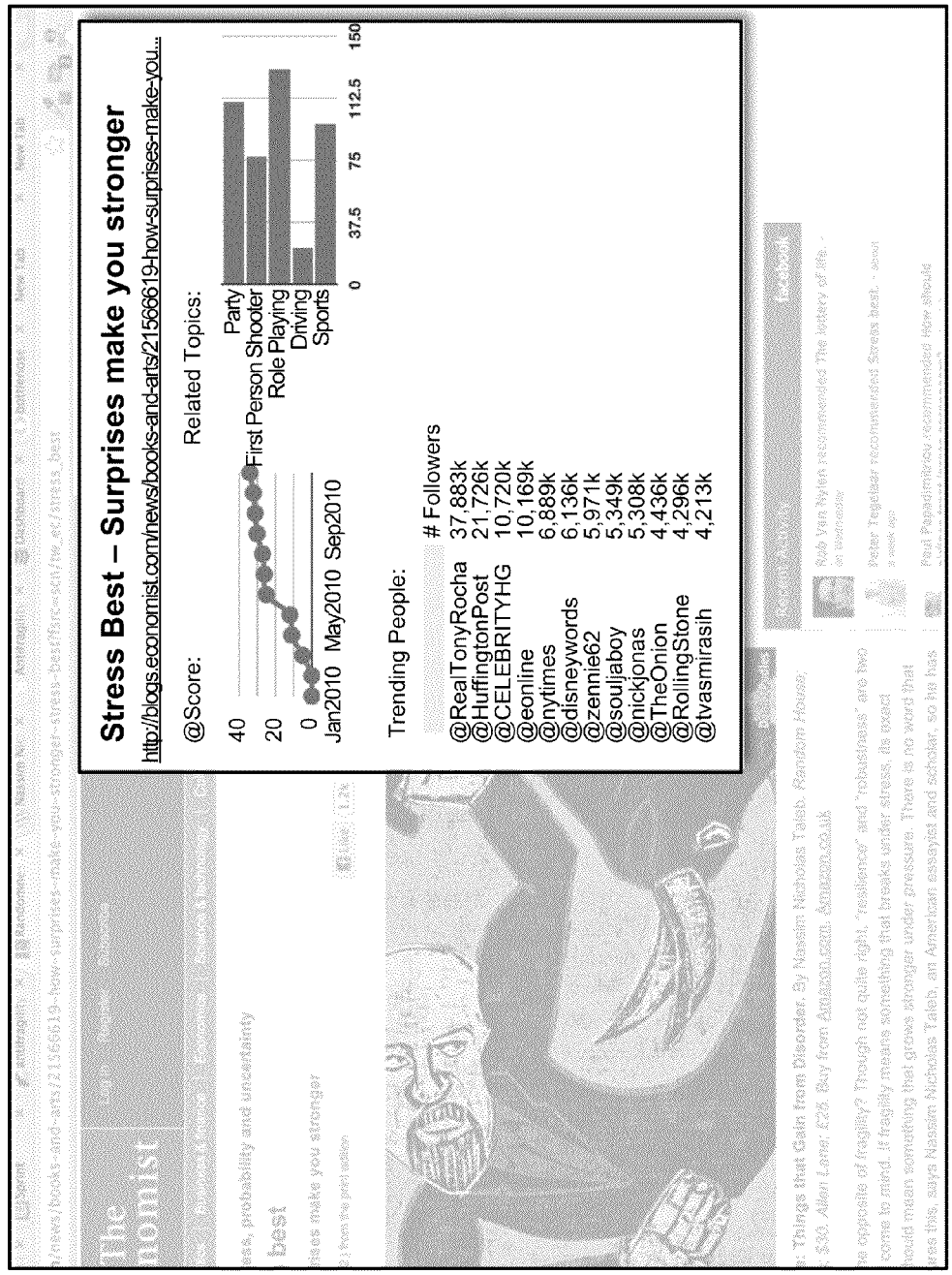
FIG. 13 illustrates a screenshot of an example attention tracker as a browser extension that provides trend insights around links visited while indexing social network data in the background.

FIG. 13 illustrates a screenshot of an example attention tracker as a browser extension that provides trend insights around links visited while indexing social network data in the background. The attention tracker then contacts the attention index server of the stream rank analyzer, i.e. a central server that manages these trackers, to receive indexing commands. The attention index has a long list of common keywords and trending topics that can be used to search real-time data on social networks. Each attention tracker will receive indexing commands that include a specific set of keywords for a topic in the indexing network. The attention tracker then goes and search for those keywords on social networks such as Twitter, Facebook, Pinterest, Tumblr, etc., and submits the results back to the central attention index server. The tracker performs the search task on a continuous basis and the frequency of search can be controlled by the indexing commands that get renewed periodically. The central attention index server filters through the IDs of the received messages and disregards any duplicate messages.

The keywords inside the indexing commands can include global popular topics, but can also include common words or expressions on social networks like "A", "http", "the". Some of these common keywords represent a large part of the activity on social networks. For example 60% of all messages on Twitter include the word "http". By continuously searching for this on the Twitter website with a random date-range interval, it is possible to siphon a large portion of the global stream with a relatively few number of attention trackers. Also, this mechanism bypasses API access controls and can not be blocked in the way that conventional indexing bots are blocked.

Another benefit is that implicit attention data can be added to the attention index. Examples of the implicit attention data include browsing behavior (e.g. which links were visited, and which pieces of metadata did those links have) or user behavior inside social networks (e.g. how long did a person look at a message, which messages were not seen, etc.). All of these implicit attention data can be used in building a map of the user population's attention in a high detail.

Real-Time Applications

In one embodiment, the social intelligence system includes an application layer for developing, running and managing real-time applications. Developers can code apps in HTML5 and JavaScript for this layer. Developers do not need to worry about integrating with hundreds of APIs. The rich metadata and structure around messages give developers the power to build highly domain specific tools and new interactive experiences around the stream.

The application layer a framework that allows plugins (also referred to as micro apps) to be developed at light speed using a technique called real-time coding. A developer can use tools provided by the social intelligence system to change the current running instance of the social intelligence system. The framework can rapidly hot-swap the changed pieces of running code. FIG. 14 illustrates a screenshot of an example dashboard interface for dynamically loading, unloading or hot-swapping micro apps. This means that right after a piece of code has been changed, the changes are visible in actual running instance of the social intelligence system. This radically changes the speed of development and the quality of code because it becomes easier to think many steps ahead.

The applications and servers of the social intelligence system can be implemented using various techniques, as readily understood by a person having ordinary skill in the art. For instance, in one embodiment, the applications running on the client nodes along with browser, browser-side routing frameworks are used to ensure UI flow is neatly structured and that user interaction is speedy. HTML5 and modern JavaScript APIs are used to allow access to storage, audio, rendering capabilities and web workers. For mobile applications the HTML and/or JavaScript programs are wrapped in a wrapper that allows communication with the mobile operating system.

In one embodiment, the server nodes of the social intelligence system uses a minimalist web framework (called Express) that runs on top of a server side software system for writing scalable internet applications such as NodeJS. The server nodes utilize the framework in combination with a JavaScript library such as SockJS to provide a real-time communication pipeline to the client-side applications of the social intelligence system.

In one embodiment, all software on the server nodes is written in JavaScript which runs in a NodeJS environment. Every message that gets posted through the client-side application of the social intelligence system will be stored with metadata on a central server implemented as a scalable, high-performance, database, such as MongoDB. The server nodes can be operated by a standard Ubuntu Linux distribution.

Since the heavy use of client-side capacity, the social intelligence system's hardware needs are relatively low. In one embodiment, social intelligence system includes multiple database servers and multiple application servers running NodeJS. Each of these servers can have a standard multi-core CPU, high memory and solid-state drive configuration. In one embodiment, third-party content delivery platform, e.g. Amazon's CloudFront CDN, can be used to rapidly serve all code, media assets and static data to client-side applications of the social intelligence system.

Figure 15:
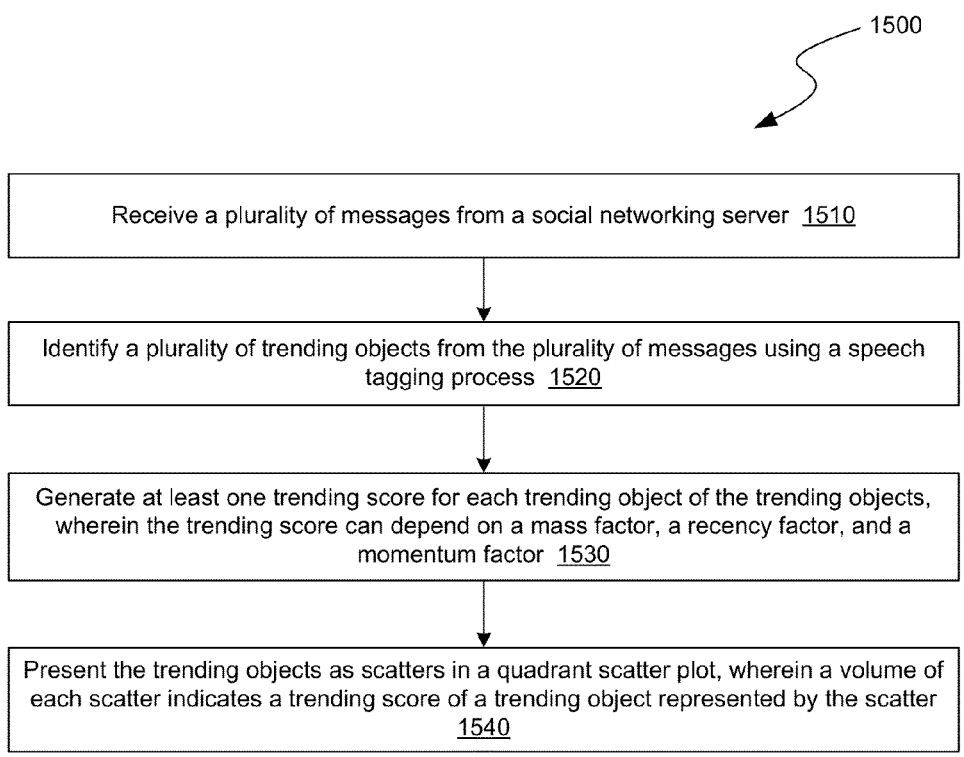
FIG. 15 depicts an example flow chart illustrating an example process for presenting trending objects based on trending scores.

FIG. 15 depicts an example flow chart illustrating an example process 1500 for presenting trending objects based on trending scores. In process 1510, the StreamSense System receives a plurality of messages from a social networking server. The plurality of messages can contain repost directives and hashtags.

In process 1520, the StreamSense System identifies a plurality of trending objects from the plurality of messages using a speech tagging process. The trending objects can include topics, types, hashtags, people, messages, or links In process 1530, the StreamSense System generates at least one trending score for each trending object of the trending objects. The trending score can depend on a mass factor, a recency factor, and a momentum factor, the mass factor indicates a number of times that the trending object occurred in the plurality of messages, the recency factor indicates how recent the trending object appeared in the plurality of messages, and the momentum factor indicates how fast the trending object gained trends in the plurality of messages. In one embodiment, the trending score can depend on a number of times that the trending object appears in the plurality of messages. In another embodiment, the trending score depends on a time period since a latest message of the plurality of messages mentioned the trending object. In yet another embodiment, the trending score depends on a number of followers of a user who mentioned the trending object in a message of the plurality of messages. In still another embodiment, the trending score depends on an interest profile of a user who mentioned the trending object in a message of the plurality of messages. In yet still another embodiment, the trending score depends on whether the plurality of messages includes the trending object or information related to the trending object. The trending score can also depends on a predetermined boost factor, wherein the predetermined boost factor controls a momentum of the trending object.

In process 1540, the StreamSense System presents the trending objects as scatters in a quadrant scatter plot, wherein a volume of each scatter indicates a trending score of a trending object represented by the scatter.

A trending score of an object does not necessarily have to be relative to a particular person. The trending scores can be universal to the users. For instance, a trending score for object X, can be calculated with respect to a person Y, wherein the trending score is based on a number of followers of person Y who mentioned the object. However, there can also be another different trending score K for object X with respect to everyone (or without respect to anyone in particular). That trending score K can be calculated using the total number of people who mentioned the object X, not just a number of followers of some specific person.

The technology of trending scores can be used to rank movies, TV shows, ads, online videos, celebrities, news articles, brands, products, photos, or anything that can be named with a label or phrase, or represented with a link or URI. Trending scores can be calculated for any object, such that it is ranked relative to all other objects in a particular category of rankings, or across categories of rankings. The trending scores rank the quantity and quality of attention to any kinds of things. For example the trend score for a TV Show would represent the quantity and quality of attention to that TV show in real-time, at the present moment as well as historically. Trending scores can be determined for any topic or resource that is discussed, shared, searched for or distributed on the Internet, social networks, or within organizations or applications. The quantity of attention to an object can be derived from the total amount of mentions of the object, and the quality of attention to an object can be derived by measuring the quality of the audience (e.g. how influential are people who share the object or mention it, by Klout score or their follower counts; or how wealthy or educated are they, or how much intent do they have to buy a certain thing, or how loyal or active or engaged they are with a topic or service, etc.).

Figure 16:
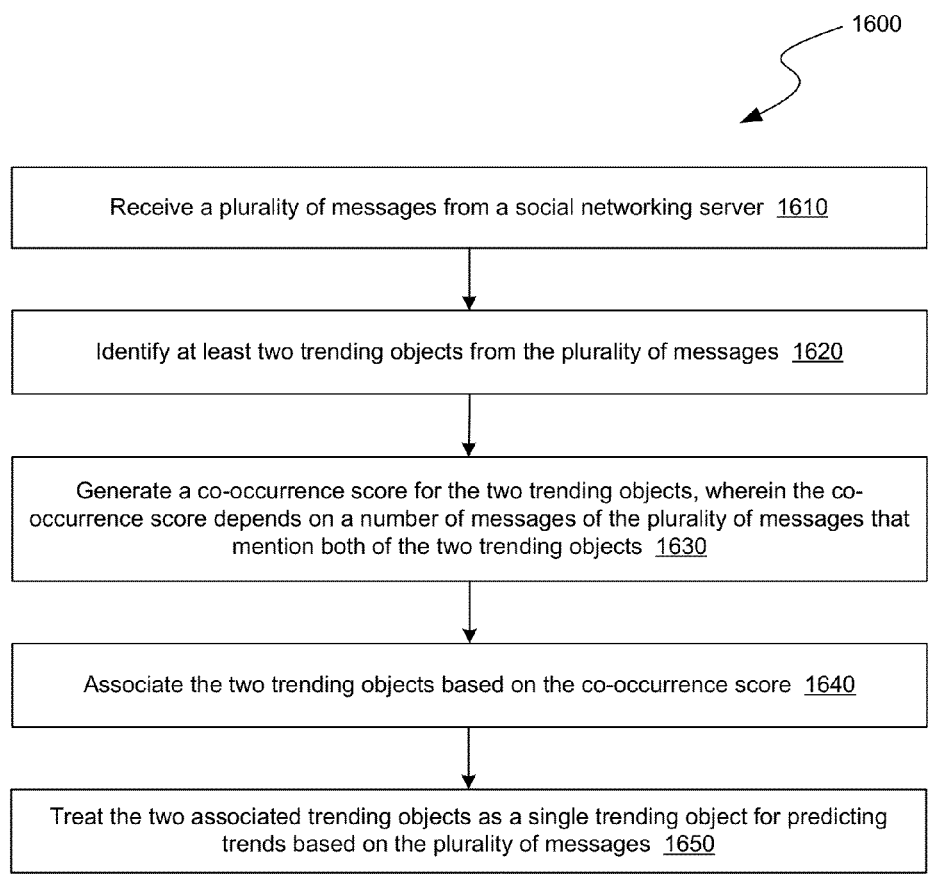
FIG. 16 depicts an example flow chart illustrating an example process for generating co-occurrence score for trending objects.

FIG. 16 depicts an example flow chart illustrating an example process 1600 for generating co-occurrence score for trending objects. In process 1610, the StreamSense System receives a plurality of messages from a social networking server. In process 1620, the StreamSense System identifies at least two trending objects from the plurality of messages.

In process 1630, the StreamSense System generates a co-occurrence score for the two trending objects, wherein the co-occurrence score depends on a number of messages of the plurality of messages that mention both of the two trending objects.

In process 1640, the StreamSense System associates the two trending objects based on the co-occurrence score. In process 1650, the StreamSense System treats the two associated trending objects as a single trending object for predicting trends based on the plurality of messages.

Figure 17:
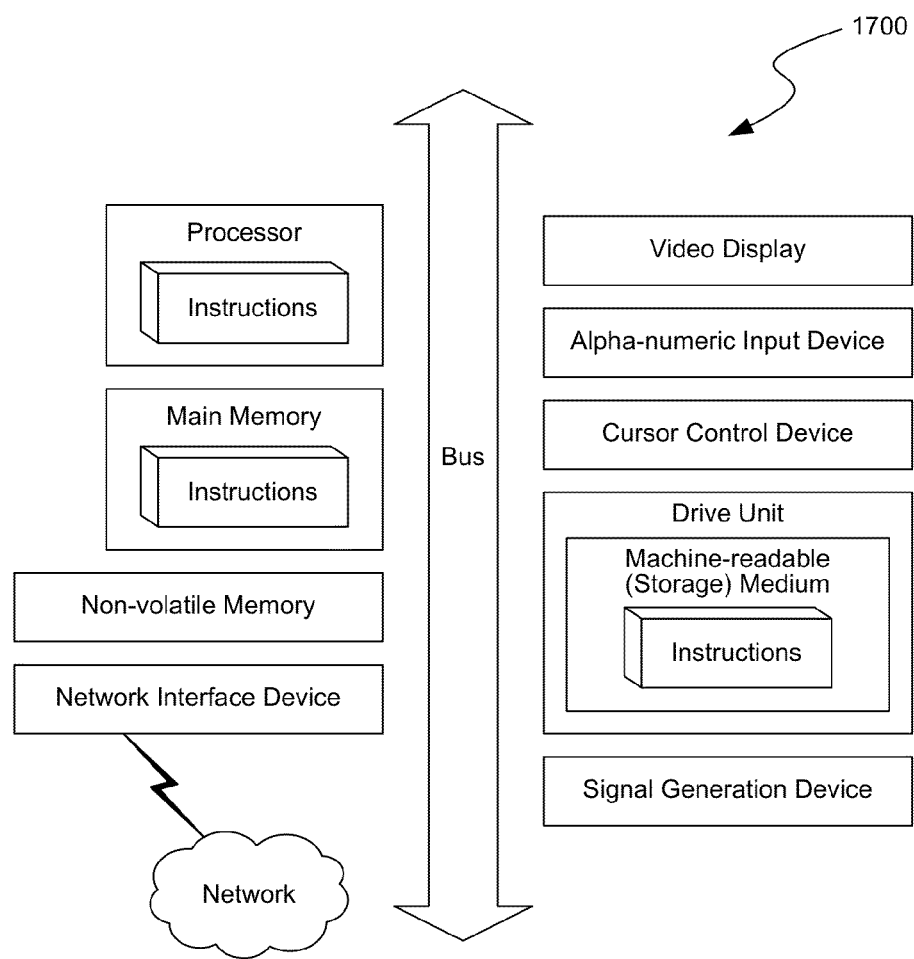
FIG. 17 shows a diagrammatic representation of a machine in the example form of a computer system within which a set of instructions, for causing the machine to perform any one or more of the methodologies discussed herein, may be executed.

FIG. 17 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1100 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method for increasing a machine's accuracy in analyzing trends within a data stream received by the machine, the method comprising:
   receiving, at a social intelligence system, a plurality of messages from a social networking server;
   identifying, using a processor of the system, at least two trending objects from the plurality of messages;
   generating, using the processor, a momentum score for each of the plurality of trending objects, wherein the momentum score is calculated based on a boost factor that: (i) exponentially decreases from a maximum boost value to a value of one (1) in a predetermined period of time starting from when an associated message is received, and (ii) continues to exponentially decrease until the associated message expires;
   generating, using the processor, a co-occurrence score for the two trending objects, the co-occurrence score is calculated based on a number of messages that mention both of the two trending objects;
   associating, using the processor, the two trending objects if the co-occurrence score exceeds a predetermined value; and
   generating, using the processor, a plurality of trending scores for the trending objects, wherein a trending score of a respective trending object is generated at least based on the respective trending object's momentum score, and wherein the generation of the trending score of the respective trending object treats the two associated trending objects as a single trending object.

2. The method of claim 1, further comprising:
   treating the two associated trending objects as a single trending object for predicting trends based on the plurality of messages.

3. The method of claim 1, wherein the trending scores are normalized to a predetermined scale.

4. The method of claim 1, wherein the trending scores are generated irrespective of any specific user of the social networking server.

5. The method of claim 1, wherein the trending objects represent a plurality of objects in a category.

6. The method of claim 5, wherein the objects in the category include movies, TV shows, advertisements, online videos, celebrities, news articles, brands, products, or photos.

7. The method of claim 1, wherein the momentum score of the trending object equals M, wherein the maximum boost value equals maxBoost, and wherein M=maxBoost/message age^(Log(maxBoost)/Log(the predetermined period of time)).

8. The method of claim 1, further comprising:
   receiving, at the social intelligence system, a query from a user;
   generating, using the processor, an importance score for each of the plurality of messages, wherein the importance score is calculated based on a multiplication product of (i) the momentum scores of all the identified trending objects that correspond to a given message, (ii) a total number of available links to the given message, (iii) a first relevancy between content of the given message and the query, (iv) a second relevancy between the trending objects that correspond to the given message and an interest profile of the user, and (v) a number of subscribers who follow an author of the given message; and
   ranking the plurality of messages based on their importance scores.

9. The method of claim 1, wherein the trending score of the respective trending object further depends on a number of times that the trending object appears in the plurality of messages.

10. The method of claim 1, wherein the trending score of the respective trending object further depends on a time period after a latest message of the plurality of messages mentioned the trending object is received.

11. The method of claim 1, wherein the trending score of the respective trending object further depends on a number of followers of a particular user or a set of users who mentioned the trending object in a message of the plurality of messages,
   The method of claim 1, wherein the trending score of the respective trending object further depends on a number of participants in a particular conversation or who interacted with contents related to a particular topic or set of topics.

12. The method of claim 1, wherein the trending score of the respective trending object further depends on an influence profile of a user who mentioned the trending object in a message of the plurality of messages.

13. The method of claim 1, wherein the trending score of the respective trending object further depends on whether the plurality of messages includes the trending object or information related to the trending object.

14. The method of claim 1, wherein the trending objects include topics, types, hashtags, people, messages, or links.

15. The method of claim 1, further comprising:
   presenting the trending objects as scatters or paths in a quadrant scatter plot, wherein a volume of each scatter indicates a trending score of a trending object represented by the scatter.

16. The method of claim 1, wherein said identifying includes:
   identifying a plurality of trending objects from the plurality of messages using a speech tagging process.

* * * * *

UNITED STATES PATENT AND TRADEMARK OFFICE
CERTIFICATE OF CORRECTION

| | | |
|---|---|---|
| PATENT NO. | : 9,009,126 B2 | Page 1 of 2 |
| APPLICATION NO. | : 13/844588 | |
| DATED | : April 14, 2015 | |
| INVENTOR(S) | : Spivack et al. | |

It is certified that error appears in the above-identified patent and that said Letters Patent is hereby corrected as shown below:

On the title page, item [56]

On the page 2, column 2, under "Other Publications", line 11, delete "Internation" and insert -- International --, therefor.

On the page 3, column 1, under "Other Publications", line 13, delete "the13th" and insert -- the 13th --, therefor.

On the page 3, column 1, under "Other Publications", line 29, delete "page." and insert -- pages. --, therefor.

On the page 3, column 1, under "Other Publications", line 38, delete "Bangladore," and insert -- Bangalore, --, therefor.

In the specification

Column 1, line 23, delete "reference" and insert -- reference. --, therefor.

Column 1, line 25, delete "SYSTEM" and insert -- "SYSTEM --, therefor.

Column 1, line 27, delete "NETWORKS,'" and insert -- NETWORKS," --, therefor.

Column 1, line 30, delete "TRENDING" and insert -- "TRENDING --, therefor.

Column 1, line 33, delete "THEREOF,'" and insert -- THEREOF," --, therefor.

Column 1, line 47, delete "NATURAL" and insert -- "NATURAL --, therefor.

Column 1, line 48, delete "CONTENT,'" and insert -- CONTENT," --, therefor.

Signed and Sealed this
Fifth Day of January, 2016

Michelle K. Lee
*Director of the United States Patent and Trademark Office*

CERTIFICATE OF CORRECTION (continued)
U.S. Pat. No. 9,009,126 B2

In the specification

Column 2, line 34, delete "analyzer" and insert -- analyzer. --, therefor.

Column 9, line 65, delete "Sentiment-20," and insert -- Sentiment -20, --, therefor.

Column 9, line 65, delete "Sentiment-19," and insert -- Sentiment -19, --, therefor.

Column 9, line 65, delete "Sentiment-18," and insert -- Sentiment -18, --, therefor.

Column 9, lines 65-66, delete "Sentiment-17," and insert -- Sentiment -17, --, therefor.

Column 13, line 23, delete "links" and insert -- links. --, therefor.